United States Patent
Anhalt et al.

(10) Patent No.: US 7,387,179 B2
(45) Date of Patent: Jun. 17, 2008

(54) TOROIDAL PROPULSION AND STEERING SYSTEM

(75) Inventors: David Jerry Anhalt, Littleton, CO (US); Jennifer Blair Herron, Littleton, CO (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 11/327,390

(22) Filed: Jan. 9, 2006

(65) Prior Publication Data
US 2006/0261771 A1    Nov. 23, 2006

Related U.S. Application Data

(63) Continuation of application No. 10/462,789, filed on Jun. 17, 2003, now Pat. No. 7,044,245.

(51) Int. Cl.
 B62D 55/07    (2006.01)
(52) U.S. Cl. ............... 180/9.1; 446/278; 600/142; 600/146
(58) Field of Classification Search ............ 446/85, 446/90, 330, 368, 369, 370, 371, 373, 375, 446/440, 445; 180/901, 7.2; 901/1, 30, 901/44; 305/165; 600/130, 139, 142; 318/568.12, 318/568.2, 568; 15/104.05, 104.09, 104.095, 15/104.31, 104.33, 104; 701/23, 24, 25, 701/50, 207, 213
See application file for complete search history.

(56) References Cited

U.S. PATENT DOCUMENTS

| | | | |
|---|---|---|---|
| 1,049,345 A | 1/1913 | Dolman | |
| 2,232,615 A | 2/1941 | Kupka | |
| 3,060,972 A | 10/1962 | Sheldon | |
| 3,190,286 A | 6/1965 | Stokes | |
| 3,601,212 A | 8/1971 | Peterson et al. | |
| 3,623,566 A | 11/1971 | Orloff | |
| 3,767,263 A | 10/1973 | Gootee | |

(Continued)

FOREIGN PATENT DOCUMENTS

JP    09144482 A    6/1997

(Continued)

OTHER PUBLICATIONS

A Robot Gets Down and Dirty, Artificial Intelligence, Popular Science, Jul. 2003, p. 42.

(Continued)

Primary Examiner—Lesley D. Morris
Assistant Examiner—Daniel Yeagley
(74) Attorney, Agent, or Firm—Banner & Witcoff, Ltd

(57) ABSTRACT

An apparatus comprises a body having a torus skin with inner and outer layers, and a drive system configured to propel the apparatus by moving the inner layer relative to the outer layer. The active skin propulsion system allows movement and steering of a device. A drive system includes a plurality of drive segments coupled together so that the skin engaging unit of the drive segment frictionally moves the inner layer of the torus skin relative to the outer layer of the torus skin. As a result of the relative skin motion and contact with the surface by the outer layer of the torus skin, the body is propelled and may be steered.

20 Claims, 36 Drawing Sheets

U.S. PATENT DOCUMENTS

| | | | |
|---|---|---|---|
| 3,797,445 A * | 3/1974 | Zeimer | 114/312 |
| 3,941,214 A * | 3/1976 | Young et al. | 187/293 |
| 4,081,182 A * | 3/1978 | O'Brien | 482/77 |
| 4,319,427 A | 3/1982 | Way, Jr. | |
| 4,558,971 A | 12/1985 | David | |
| 4,636,137 A * | 1/1987 | Lemelson | 414/730 |
| 4,770,105 A | 9/1988 | Takagi et al. | |
| 4,773,528 A | 9/1988 | Anderson et al. | |
| 4,821,192 A * | 4/1989 | Taivalkoski et al. | 701/25 |
| 4,829,442 A * | 5/1989 | Kadonoff et al. | 701/207 |
| 4,834,478 A * | 5/1989 | Stevens et al. | 305/124 |
| 4,838,373 A * | 6/1989 | Price et al. | 180/9.46 |
| 4,981,188 A | 1/1991 | Kadela | |
| 5,297,644 A | 3/1994 | Clar et al. | |
| 5,355,743 A | 10/1994 | Tesar | |
| 5,628,667 A | 5/1997 | Levi | |
| 5,662,587 A | 9/1997 | Grundfest et al. | |
| 5,672,044 A * | 9/1997 | Lemelson | 414/744.3 |
| 6,178,872 B1 | 1/2001 | Schulz | |
| 6,267,196 B1 * | 7/2001 | Wilcox et al. | 180/347 |
| 6,505,525 B2 * | 1/2003 | McGrew | 73/865.8 |
| 6,508,188 B2 * | 1/2003 | Dong et al. | 114/67 R |
| 6,512,345 B2 | 1/2003 | Borenstein et al. | |
| 6,567,687 B2 * | 5/2003 | Front et al. | 600/426 |
| 6,774,597 B1 | 8/2004 | Borenstein | |
| 6,802,237 B1 * | 10/2004 | Jones et al. | 89/1.13 |
| 6,824,510 B2 | 11/2004 | Kim et al. | |
| 6,846,029 B1 * | 1/2005 | Ragner et al. | 294/86.4 |
| 6,971,990 B2 * | 12/2005 | Ziegler et al. | 600/114 |
| 2002/0091466 A1 * | 7/2002 | Song et al. | 700/245 |
| 2002/0190682 A1 | 12/2002 | Schempf et al. | |
| 2003/0065250 A1 | 4/2003 | Chiel et al. | |
| 2006/0089533 A1 * | 4/2006 | Ziegler et al. | 600/114 |

FOREIGN PATENT DOCUMENTS

JP      11022385 A      1/1999

OTHER PUBLICATIONS

Budget Robitics, http://www.budgetrobotics.com/shop/index.php?shop=1&cat=49, Jun. 3, 2003, pp. 1-2.

Raving Toy Maniac, http://www.toymania.com/news/messages/2862.shtml, Jun. 3, 2003, pp. 1-3.

* cited by examiner

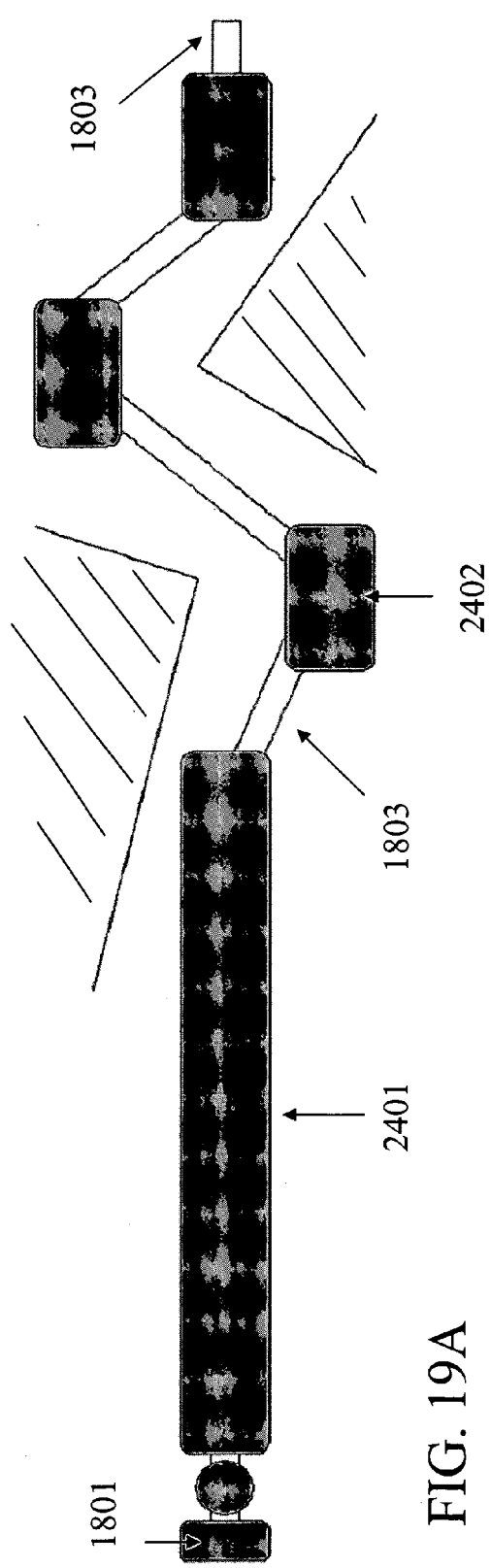
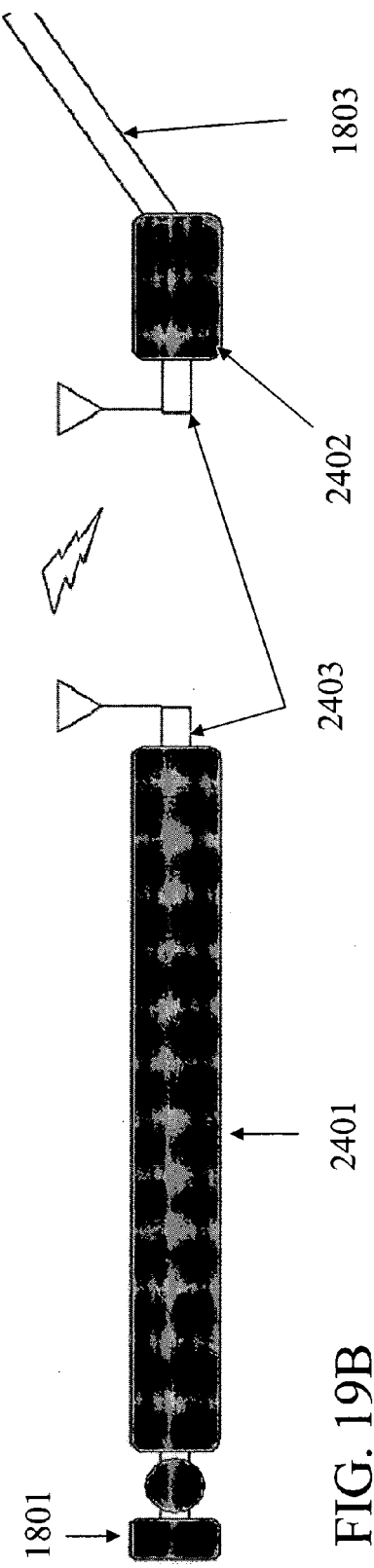
FIG. 19A
FIG. 19B

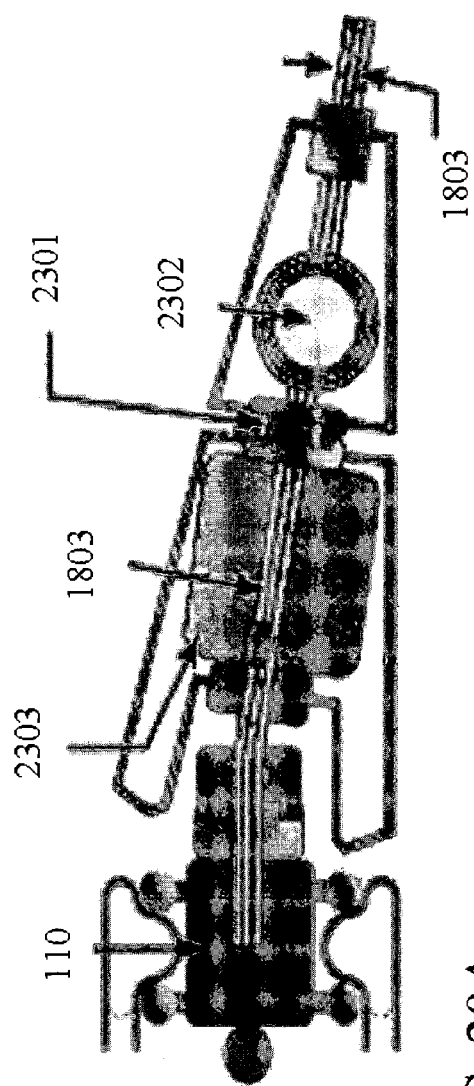
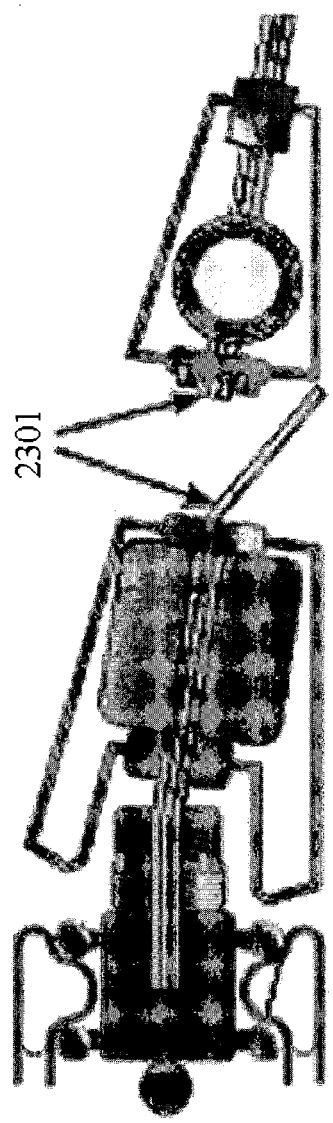
FIG. 20A
FIG. 20B

TOROIDAL PROPULSION AND STEERING SYSTEM

This application is a continuation application of application Ser. No. 10/462,789, filed Jun. 17, 2003, now U.S. Pat. No. 7,044,245, issued May 16,2006 and herein incorporated by reference in its entirety.

FIELD OF THE INVENTION

This invention relates to a device having a drivable outer skin and propulsion and steering system to drive the skin.

BACKGROUND OF THE INVENTION

Unmanned devices have been used for various applications including demolition, exploration, and reconnaissance. Such devices have taken the form of winged-type robots, legged-type robots, and snake-type robots. Winged-type robots have drawbacks in that they require extreme miniaturization. Typically, the extreme miniaturization process is complex, expensive, and is susceptible to error. Additionally, winged-type robots provide little or no payload either for demolition purposes or reconnaissance. Winged-type robots also possess very limited and/or specialized perception which can be drawback regarding versatility, functionability, maneuverability, and information gathering.

Legged-type robots have drawbacks in that they are often slow. They also are unable to negotiate varying terrains and environments. They are susceptible to becoming entangled and easily disoriented so that their propulsion system becomes inoperable or loses contact with the terrain. Additionally, legged-type robots are normally impeded by water, mud, sand or similar terrains.

Existing snake-type robots have been less than satisfactory. Wheels or skids were placed under vertebrate to allow the snake to slowly inchworm along. Moreover, existing snake-type robots have been incapable of effectively operating on rugged terrain or performing rectilinear motion. Further, most existing snake-type robots cannot swim, climb or burrow. Additionally, skeletal snakes snag on projections and rough terrain, and are unable to navigate tight, irregular, and rough terrains.

BRIEF SUMMARY OF THE INVENTION

To overcome limitations in the prior art, and to overcome other limitations that will be apparent upon reading and understanding the present specification, the present invention is directed to a toroidal propulsion and steering system having potential applications in military, Special Operations, search and rescue, security, inspection and numerous other applications.

A first aspect of the invention provides an active skin propulsion system. A drive system frictionally moves a toroidal skin that, when contacting a surface, results in propulsion. More specifically, frameless DC motors force drive wheels or gears that directly or indirectly frictionally move the toroidal skin. Drive rings within the skin facilitate motion when the skin is pinched between the drive wheels and/or gears and the drive ring. In certain instances one or more idler wheels or gears may be attached to form part of the drive ring to further facilitate motion. The system can be steered by varying skin tensions and the relative distance between the location on the skin where certain drive wheels or gears contact the torus skin and/or through actuation controls.

A second aspect of the invention provides a snake-like robot. Like biological snakes, the device possesses an unusual mix of qualities and capabilities that make it desirable for robot mimicry. Generally, an active skin propulsion and steering system allows speedy, stealthy, precise and reliable motion and control through practically any environment. The toroidal skin of the propulsion system moves the device through frictional contact with the surface or environment. All and any sides of the torus skin are used to propel and move the device when in contact with a surface of the environment. Similarly, the device possesses any side up mobility characteristics which allows it to operate in extremely precarious environments without becoming inverted or its propulsion or motion source becoming disabled. Linked vertebra members provide structure, allow movement, pivoting and turning. They are often located within a torus hole or internal cavity formed by the torus skin.

A third aspect of the invention provides for a snake robot or device specifically operable for Special Forces Operations, anti-terrorists communities, or related applications. This snake robot or device may be equipped with among other things demolitions capabilities, and/or sensing capabilities beneficial for offensive, reconnaissance, and tactical operations by Special Forces. Further, a snake robot may be configured so as to allow it to be sacrificed in the course of performing demolition or interference functions.

A fourth aspect of the invention provides for a snake robot or device specifically operable for surveillance, evidence, and intelligence gathering and related activities. This snake robot or device may be equipped with among other things a variety of sensors, microphones, recording devices, sample gathering apertures, and supplemental power supplies to enable lengthy operation away from its deployment source. The snake transfers observations to the controller or similar location while continuing its surveillance, reconnaissance or evidence gathering.

A fifth aspect of the invention provides for a snake robot or device specifically operable for Search and Rescue and related activities. This snake robot may be equipped with among other things illumination sources, microphones, grasping apertures, ropes or lines and other search and rescue components. The skin may be textured or include scales for greater traction in moving payload. A deployable tethered tail may be used to aid in navigation of small, winding, confining, and precarious locales. The snake may release its tail to allow continued navigation of locales unreachable by further tethered operation. The released tail of the snake may serve as a local wireless communications point to enable control and communication with the robot within confining and normally communication prohibitive environments.

A sixth aspect of the invention provides for a snake robot or device specifically operable for commercial activities including inspection of industrial spaces, tanks, underground structures, bridges, building infrastructure, as well as pipe crawling and related activities. This snake may be equipped with among other things sensors selectable to serve desired inspection requirements. This snake can navigate into tight quarters and allows inspection of hazardous and inaccessible areas of industrial and similar spaces with risking a human injury or requiring movement or rearrangement of large objects that block spaces to be searched. The snake can inspect pipes, crawlspaces, ducts and other spaces inaccessible to humans.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 19A, 19B, 20A, and 20B illustrate exemplary diagrams of tails of a snake-type robot.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications made be made without departing from the scope of the invention.

Figure 1:
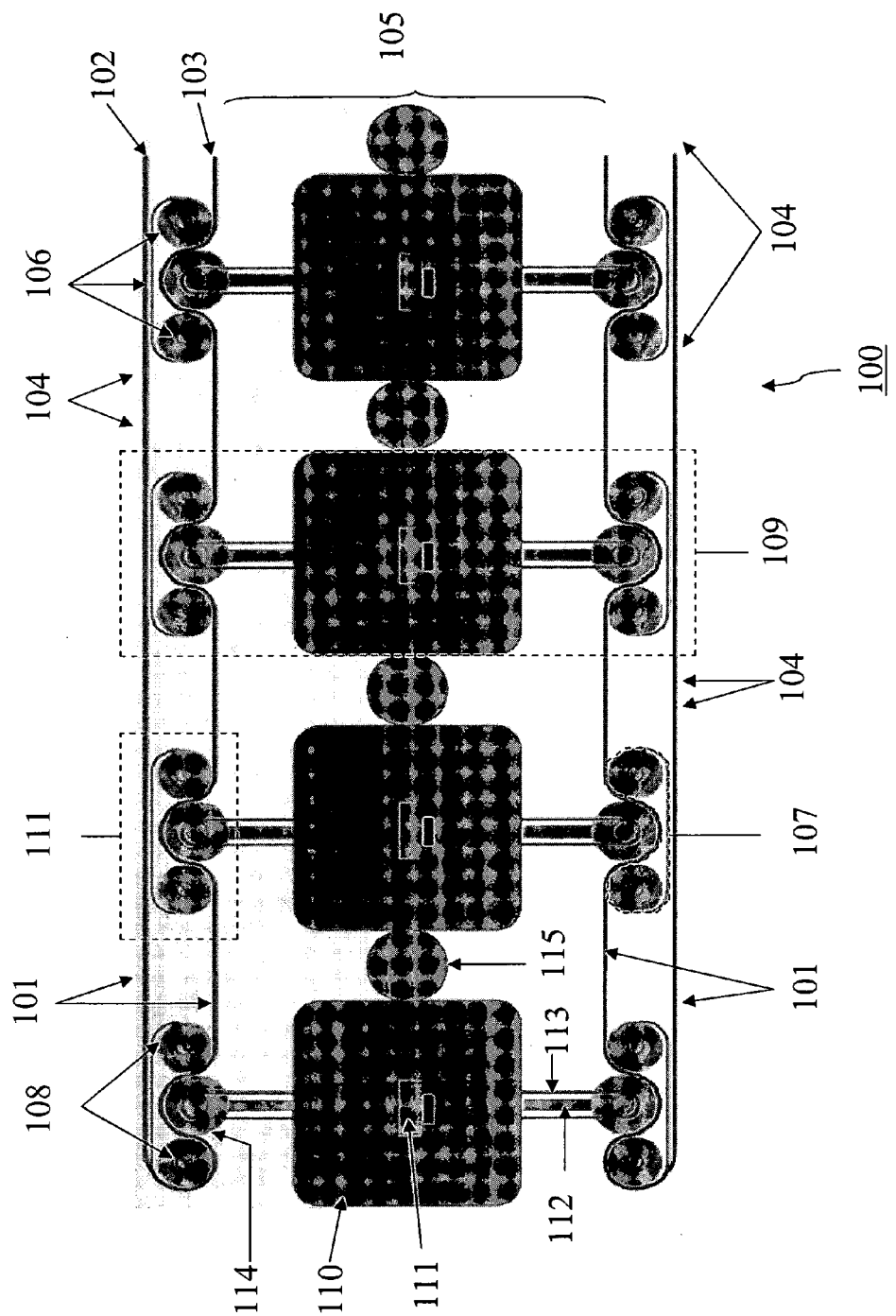
FIG. 1 illustrates a diagram of an active skinned propulsion system that can be used in among other things a robot snake.
Figure 2:
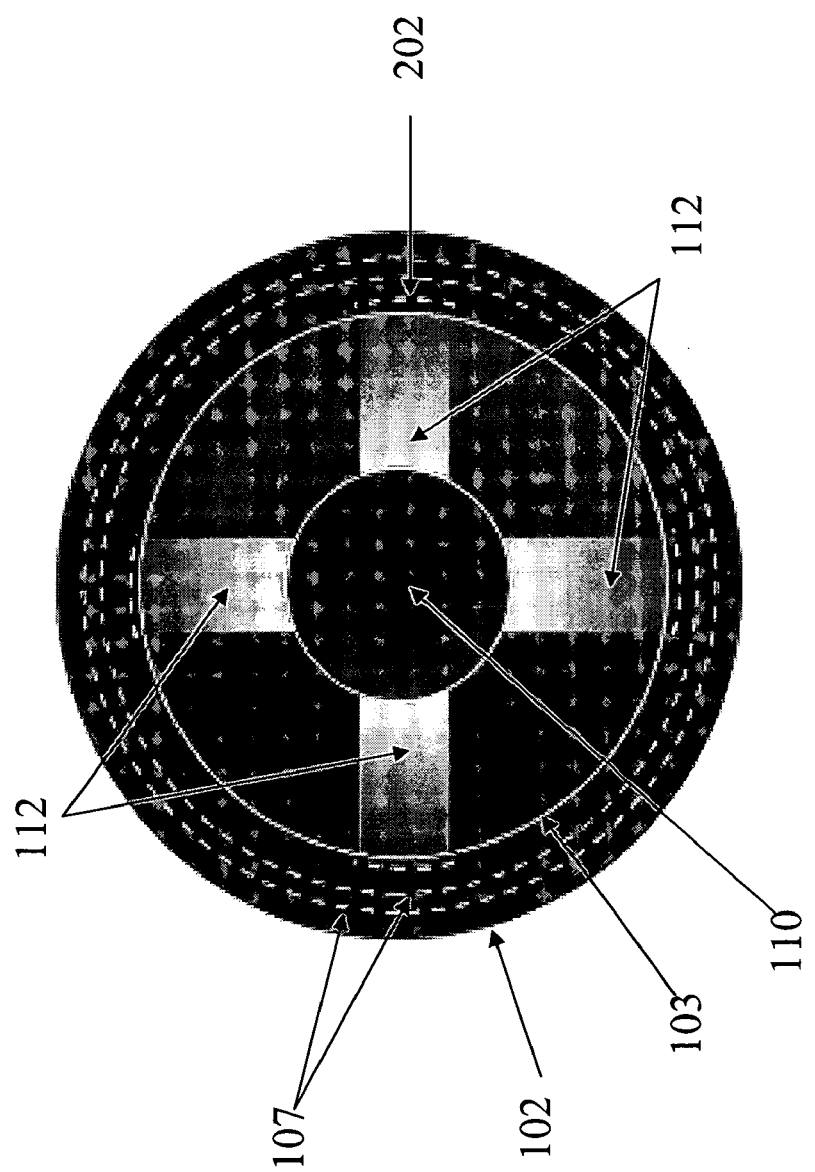
FIG. 2 illustrates a conceptual end view diagram of a configuration of an active skinned propulsion system.

FIGS. 1 and 2 illustrate lateral and end views of an active skinned propulsion system that can be used in among other things a snake type robot 100. The active skin propulsion system in FIG. 1 includes a toroidal skin 101 and a drive system. The skin 101 can be driven as an endless tread and can be described generally as having an outer run 102 and an inner run 103. Additionally, the skin can be driven in select regions to propel the snake-type robot in other ways such as in a curved or serpentine-like manner. The outer run 102 of the skin forms what can be described as the body exterior 104, and at least part of the outer run 102 engages the ground or other surface. The area radially inward of the inner run 103 can be described as the body interior 105. The drive system includes a plurality of drive segments 109 coupled together by links or couplings 115 between adjacent drive segments 109. Various linking and coupling embodiments are discussed later in the specification.

The active skin propulsion system, in several exemplary embodiments, may be considered to possess a longitudinal center line running through the inner cavity, about which the system is formed. The inner and outer runs of the active skin system surround this center line and may be considered to form cylinders, tubes and other related geometric shapes. The location of such theoretical center line may be apparent, for example, in FIGS. 1, 8A, 8B, 16, 17, and 26, among others.

The drive segment is composed of a motor 110, angularly spaced skin engaging units 11, spacer members 112, and belts 113. The skin engaging units are preferably angularly spaced equally around the body. In FIG. 2, the four skin engaging units and adjoining spacer members 112 depicted are arranged 90° apart around the body.

The skin engaging unit 111 includes a motion assisting component 106 located between the inner run 103 and the outer run 102. In the embodiment depicted in FIG. 1 and FIG. 2, the motion assisting component 106 is a friction imparting ring 107 including two idler wheels 108. The motion assisting component in other embodiments may include lobed solid structures in lieu of idler wheels 108. The frictional imparting ring 107 may be composed of various metals, plastics, and other structural materials. Light weight metals such as aluminum serve the structural requirements of the ring while minimizing the weight of the robot 100.

In the embodiment depicted in FIG. 1, a skin engaging unit further includes a drive wheel 114, a friction imparting ring 107 and two idler wheels 108 attached to the friction imparting ring. The motor 110 drives the drive wheels either directly or indirectly through the belt 113. The drive wheel can be held in place by the spacer member 112 or directly attached to the motor 110. Portions of the inner run 103 of the skin 101 are pinched between the friction imparting ring 107, the idler wheels 108, and the drive wheel 114 and are frictionally engaged and moved relative to the outer run 102. Since the skin 101 is an endless body, the frictional movement of the inner run 103 of the skin forces the outer run 102 of the skin to move. The resulting motion of the outer run 102 of the skin when in contact with the surface or the environment propels the body rectilinearly.

The drive system drives the skin 101 as a tread to propel the body and it may also drive the skin to move and turn the body in serpentine-like and other manners as will become evident from the description to follow. In an exemplary embodiment, both such drive functions are performed by common components and are effected by engaging the skin 101 to impart forces to the skin 101. At least one driven wheel and a cooperating surface on the opposing side of the inner run 103 pinch the skin 101 such that a rotating wheel frictionally forces the inner run 103 to move thereby propelling the snake-type robot 100.

The motor utilized in the drive system may vary depending on the desired functionality of the device. In an exemplary embodiment, the motors 110 are closed-loop encoded frameless DC motors built into the drive wheels themselves and allow precise vertebral or segmental control. Small skin-drive motors at each drive segment may be used to evenly spread weight, drive power task, and increase fault tolerance. The skin drive can also be powered by the new generation of ultrasonic motors, which offer high torque at low RPM. The motor, electrical components, and a portable power source, should the device have such a feature, could be located within a central portion of the interior of the body 105. The motor 110 may also be located within the drive wheel 114.

FIG. 2 also depicts the outer run of the torus skin 102. As was described previously, the outer run 102 of the skin defines the exterior of the body, while the area radially inward of the inner run 103 of the skin is considered the interior of the body 105. The torus, an exemplary embodiment of which is depicted in the end view of FIG. 2, is generally a doughnut-like shape in which the inner run 103 and outer run 102 of the skin 101 form the outer ring of the donut shape. This end shape extends in a cylindrical manner from the end doughnut appearing plane. The torus forms generally a flexible tube with internal segments linked together within the body interior 105.

Figure 3:
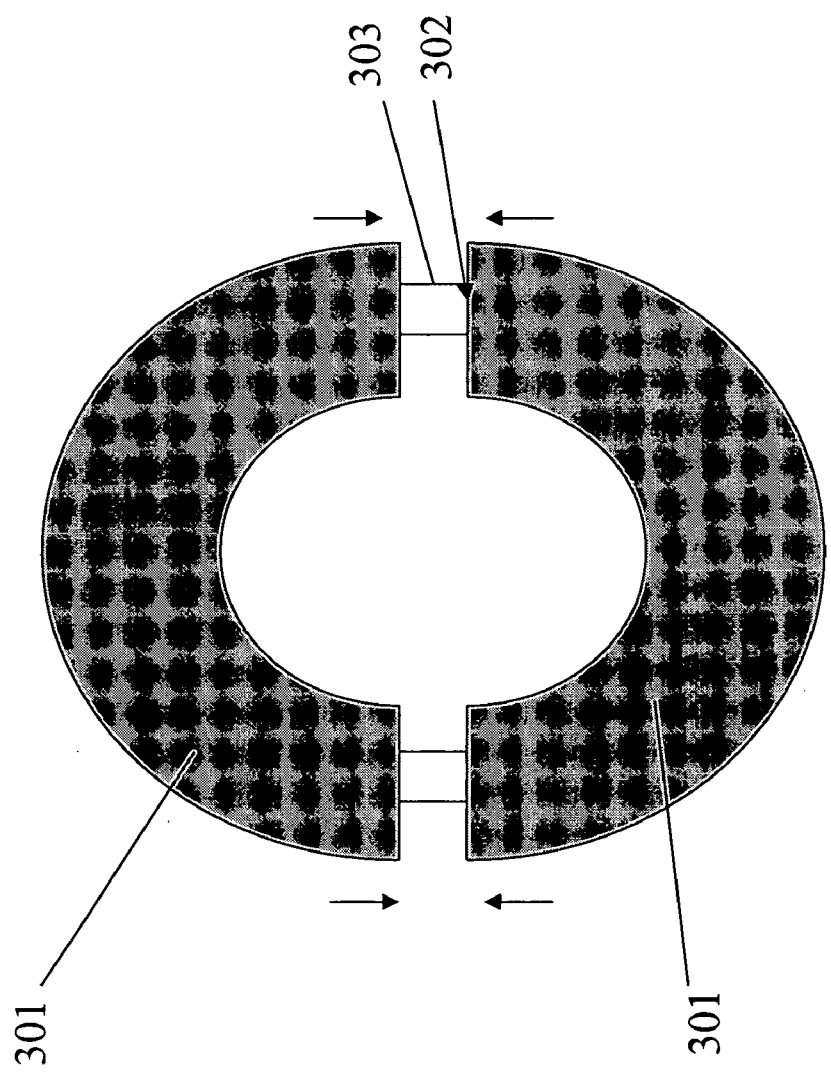
FIG. 3 illustrates an exemplary diagram of a split ring.

FIG. 3 is a schematic diagram of an exemplary embodiment of a friction imparting ring 107 placed between the inner run 103 and the outer run 102 of the skin 101. In this embodiment, the friction imparting ring 107 is formed by two or more angular sections 301 and is thus a split ring. The split ring feature of the friction imparting ring further facilitates its placement between the inner run 103 and outer run 102 of the torus during assembly which is described later. The split ring in FIG. 3 is composed of two angular sections 301 which contain internal holes 302 that are configured to hold springs 303. These springs 303 hold the friction imparting ring 107 together structurally through tension force supplied from the springs. Any conventional tension spring may be used to supply the tensioning force that holds the friction imparting ring 107 together.

Figure 4B:
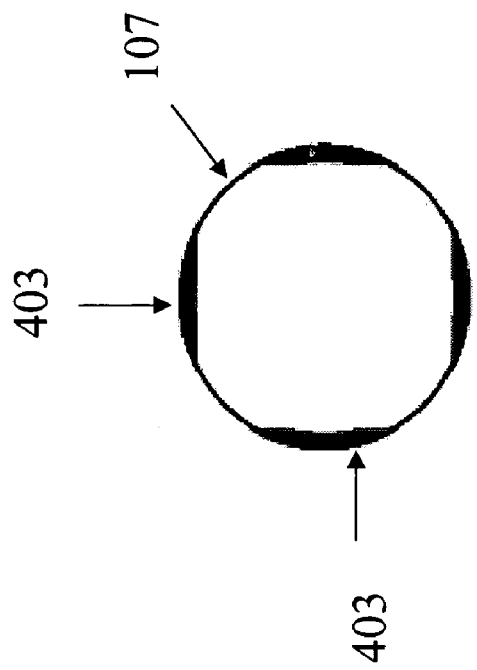
FIGS. 4A and 4B illustrates exemplary embodiments of wrinkle limiting or prevention rings.
Figure 4A:
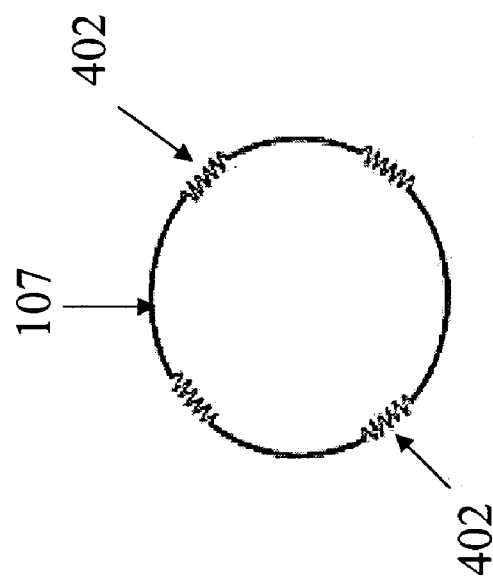

The friction imparting ring 107 also minimizes wrinkling that could potentially cause a clog or obstruction in the skin engaging units, and thereby minimizes the possibility of an impediment to propulsion or steering by that specific drive segment. Alternative embodiments of the friction imparting ring 107 are shown in FIGS. 4A and 4B. FIG. 4A depicts a friction imparting ring 107 constructed with bellows 402 that spreads the skin as the skin slides over the bellowed area. The bellows provide room for expansion and provides additional circumferential space for the skin to spread over the ring. The bellowed ring forces wrinkling to occur away from the skin engaging units 111. FIG. 4B depicts a friction imparting ring 107 constructed with selected areas of varying thickness 403 to also allow additional circumferential spreading of the skin. The additional circumferential spreading room coupled with any tangential tension supplied by these friction imparting ring geometries limits or eliminates detrimental skin wrinkling and forces the remaining wrinkling to occur away from the skin engaging units 111.

Figure 5:
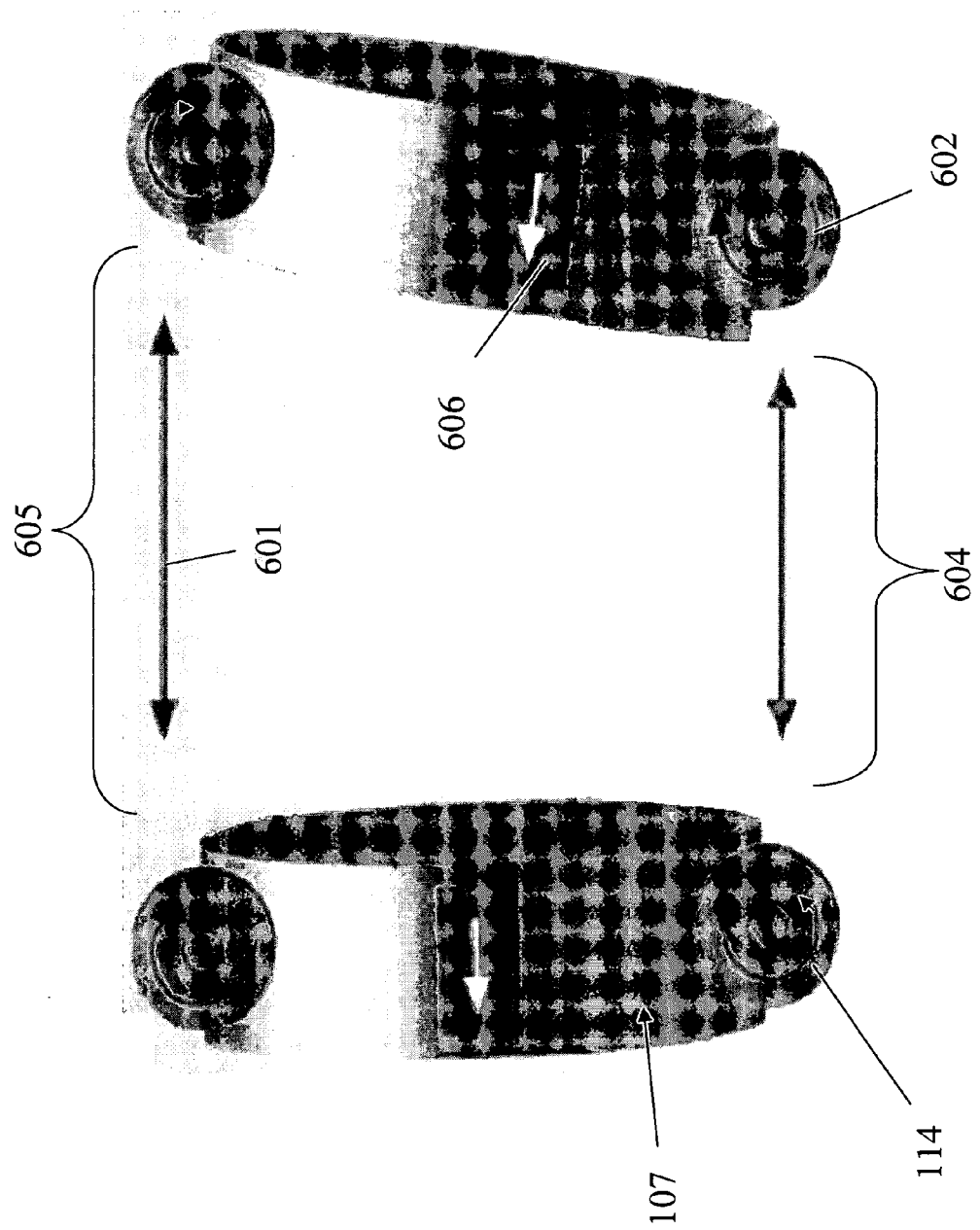
FIGS. 5, 6, 7, 8A and 8B illustrate exemplary diagrams of angular actuation methods to achieve steering.

FIGS. 5, 6, 7, 8A, and 8B are illustrative diagrams of embodiments for achieving angular actuation that can be used to steer the torus skin body. The actuation embodiments depicted in FIGS. 5-8 and described below can be used in any snake-type robot depending on the desired actuation and steering functionality. Additionally, universal joints, solenoids, bearings or any conventional linking device or mechanism that allows movement or pivot may be used as the connecting device 115 that connects the drive segments. Further, the body's angular motion can be a result of Shape Memory Alloys (SMA), or "muscle" actuators based on pneumatics, metal hydride, or piezo-electric contractions. In FIG. 5 two friction imparting rings 107 with drive wheels 114 that may be located adjacent or attached to the rings are depicted without a linking component for illustrative purposes only to further and more simply illustrate the concept of moving rings angularly about a center point located within the ring. The arrows 606 located on the rings indicate the general motion of the body in which these ring are located. The double-sided arrows 601 located between the friction imparting rings indicate that the distance between the rings at certain locations is variable. The skin tension is varied at different locations by the drive wheels to steer. Further, to angularly actuate the body, the drive wheels of the rings are rotated at different speeds and/or different directions. In FIG. 5, the single sided arrow 602 located on the drive wheels indicate the rotational direction of each drive wheel in order to cause the body to move and/or to cause the drive rings to vary their position. Here the arrows indicate the direction of rotation that could cause the snake to pivot. The rings began longitudinally parallel to each other. In the present pivoted state the relative distance between the lower portions of the rings 604 is smaller than the relative distance between the upper portion of the rings 605.

Figure 6:
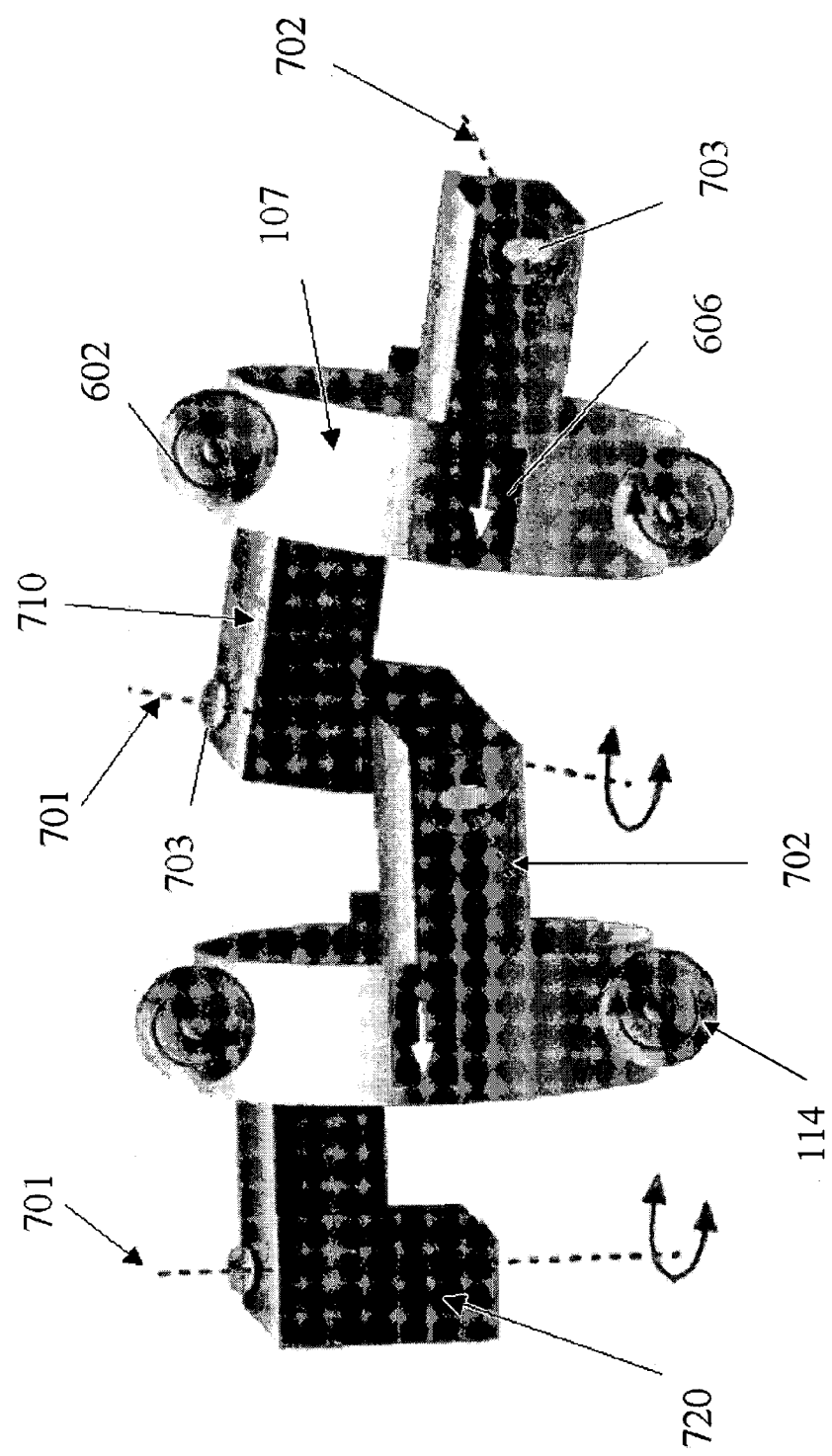

FIG. 6 depicts a diagram of an exemplary coupling device 115 embodiment for achieving angular actuation. In this embodiment, two friction imparting rings 114 are connected by angular pivots. Horizontal actuating member 710 links the drive segment 109 to a connecting actuation box member 720. The box member 720 is connected to the horizontal members through pin connections 703 or any other conventional pivot connection. The coupling between the two friction imparting rings, and more generally the two drive segments 109 in FIG. 1, may be angularly rotated in two distinct planes by pivotal pin connections 703. The use of two pin connections, each of which allows angular rotation in orthogonal planes when moved together allow each segment 109 to be moved three dimensionally. Dashed line 701 represents a longitudinal axis and dashed line 702 represents a horizontal axis upon which either passive or active angular actuation between drive segments can be performed. In an exemplary embodiment of a coupling device, active actuation is achieved by using motors or force imparting elements to cause rotation of the connections 703 around axis 701 and/or 702.

Figure 7:
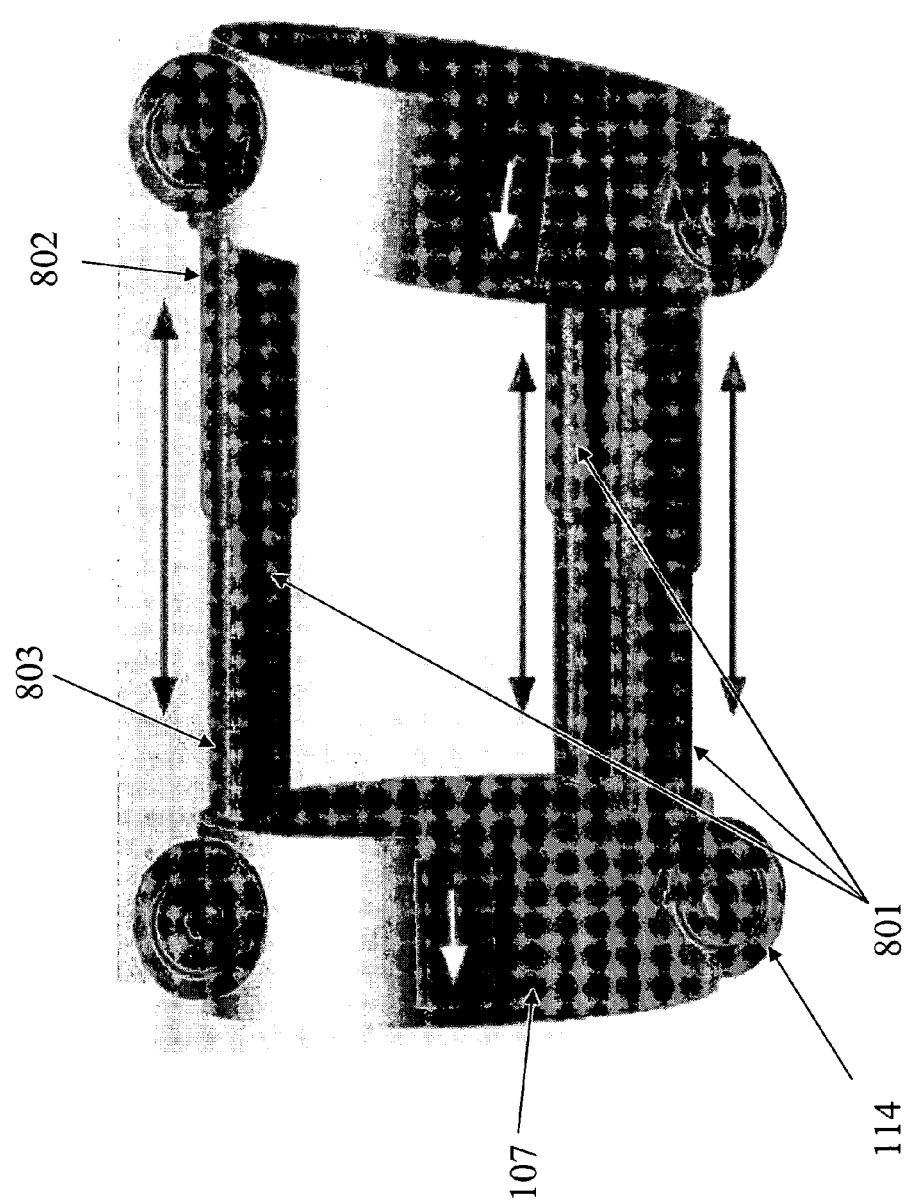

FIG. 7 depicts an exemplary embodiment for angular actuation. In this embodiment, linear mating slide cylinders 801 located between the friction imparting rings 107 allow active or passive angular actuation between the drive segments. Active actuation is achieved by powering the horizontal slide cylinders. A portion of the small slide cylinder 803 is moved within the large slide cylinder 802, thereby shortening the distance between the friction imparting rings 107 or drive segments 109 at that relative locale. This change in relative distance causes a turning, steering, or serpentine-like motion. Actuation and steering results by varying the position of the small slide cylinder 803 and large slide cylinder 802. When the powered horizontal slide cylinder is contracted so as to shorten its horizontal length, the attached friction imparting ring 107 is angularly actuated causing that drive segment and the device at that locale to similarly move.

Figure 8A:
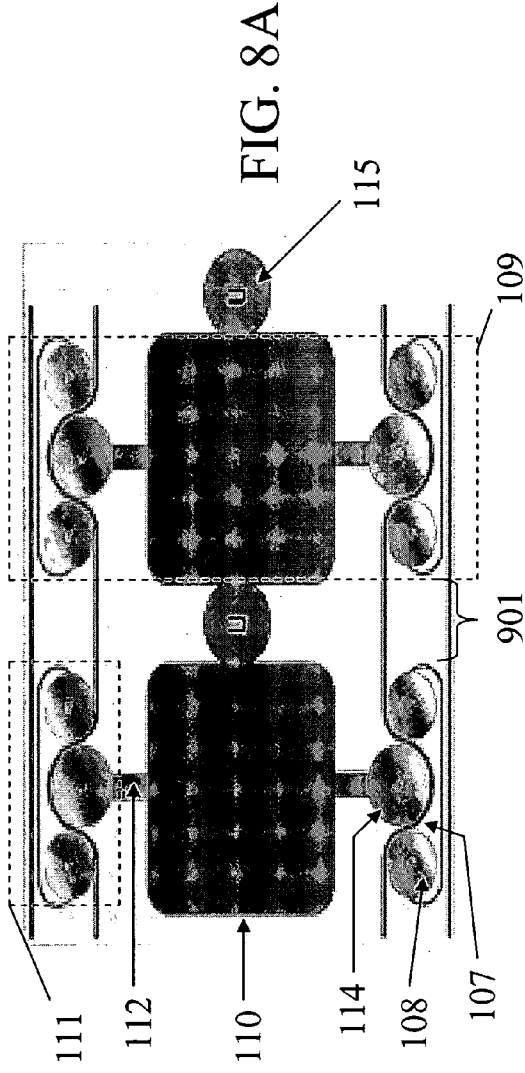
Figure 8B:
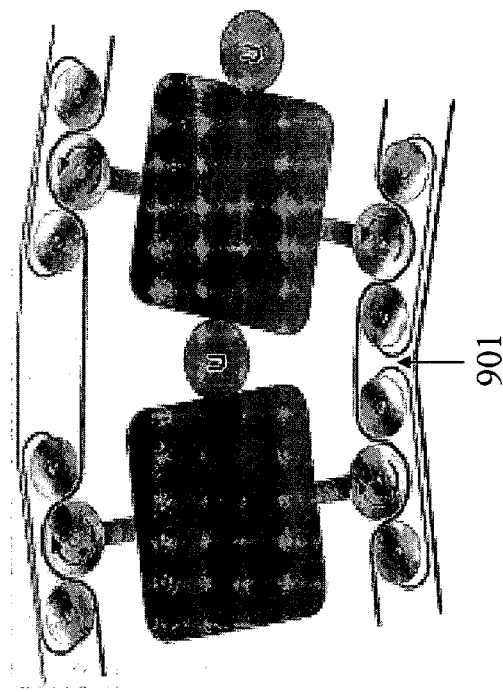

FIGS. 8A and 8B are diagrams of exemplary steering methods for snake-type robots. In this embodiment the couplings are universal joints. In FIG. 8A the torus body is depicted prior to angular actuation or steering. The body may be at rest or may be moving in simple rectilinear motion. The drive wheels 114 of all of the skin engaging units 111 are rotated preferably at the same speed and in the same direction. The drive wheels frictionally engage and drive the inner run 103 relative to the outer run 102. The spacing 901 between the skin engaging units 107 is uniform around the body. In FIG. 8B, steering, turning or serpentine-like or related motion is in progress. The drive wheels 114 are rotating in different directions and/or at different speeds. The variation in direction and/or speed of drive wheel rotation causes the relative location of the skin engaging unit to vary. The change in spacing 901 in FIG. 8B relative to the original spacing from the original linear or rest position depicted in FIG. 8A causes the body to pivot or turn.

Figure 9:
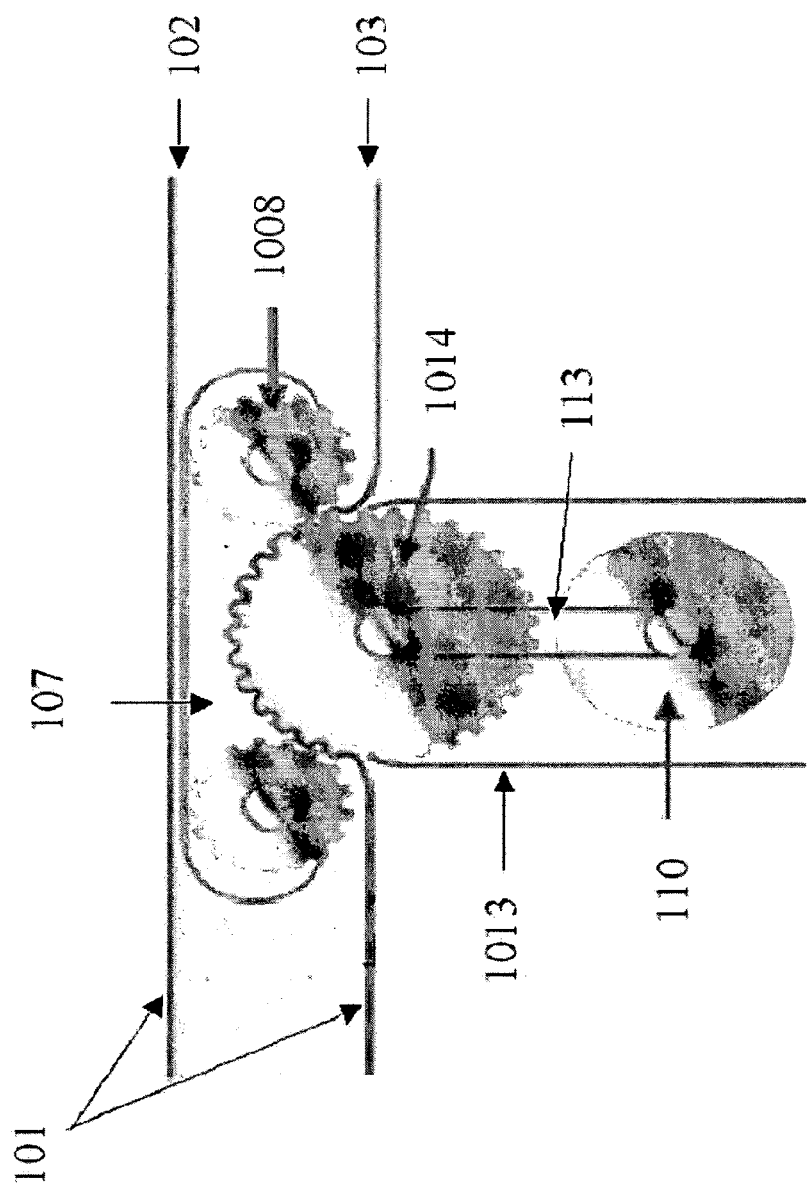
FIGS. 9, 10, 11A, 11B, 12, and 13 illustrate exemplary diagrams of skin engaging units.

FIGS. 9-13 are illustrative diagrams of further embodiments of skin engaging units, each of which may be used to drive any of the various snake-type robot embodiments later described. Generally, the skin engaging units 111 are biased to cause forces to act on drive wheels 114 and further cause them to frictionally engage the torus skin 101 pinched between the drive wheel 114 and an opposing surface. The skin engaging unit uses a toothed drive gear 1014 in lieu of a drive wheel 114, to frictionally drive the skin 101 as is depicted in FIG. 9. Similarly, FIG. 9 depicts use of toothed idler wheels 1008 located within the torus in lieu of idler wheels 108.

Figure 10:
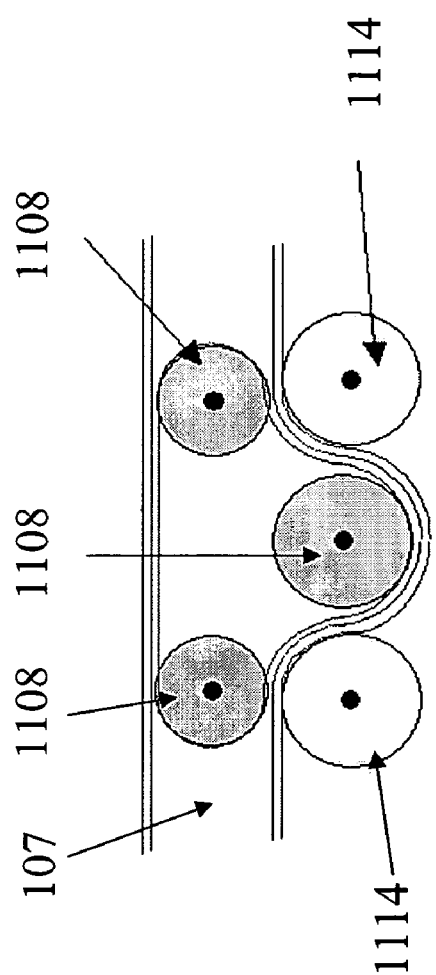

FIG. 10 is a further illustrative diagram of an exemplary skin engaging unit 111. In this embodiment three idler wheels/bearings 1108 are inserted into the friction imparting ring 107 and two drive wheels 114 frictionally engage the skin 101. Each drive wheel 1114 pinches the skin along the surfaces of two idler wheels/bearings 1108. Drive wheels 1114 frictionally engage the inner run 103 of the skin when it is pinched between the drive wheels 1114, the friction imparting ring 107, and the idler wheels 108.

Figures 11A, 11B:
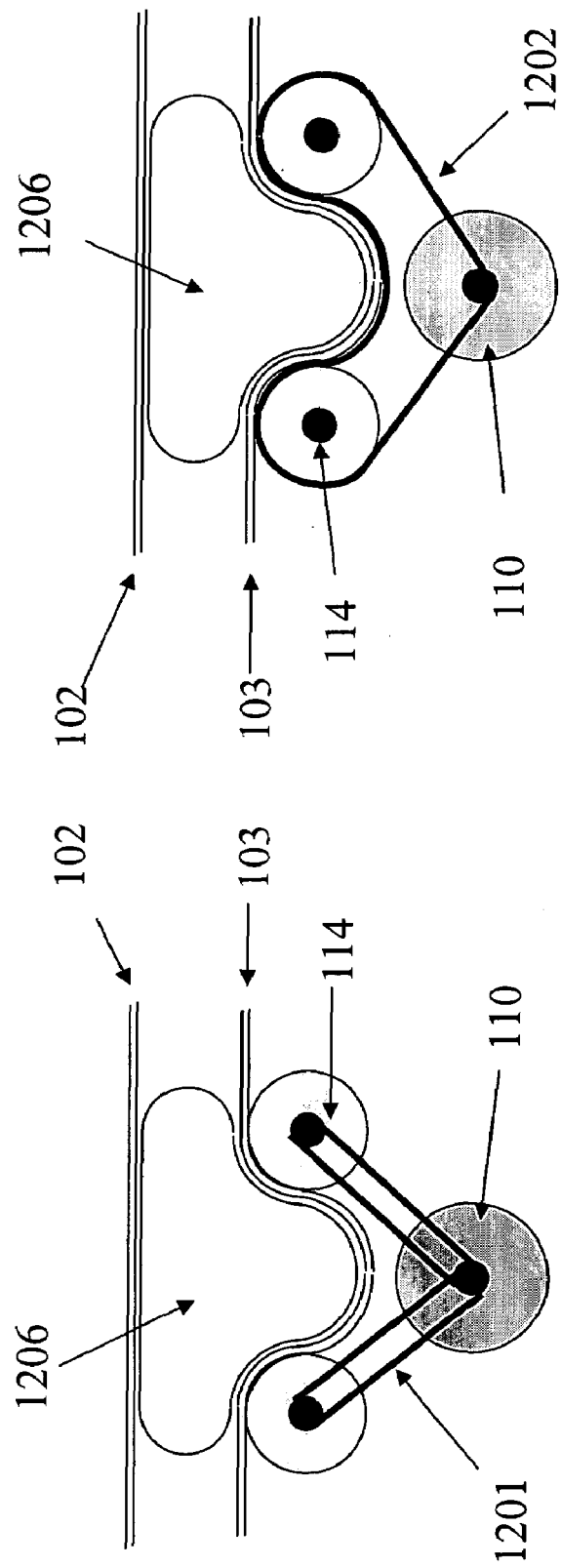

FIGS. 11A and 11B are further illustrative diagrams of a skin engaging unit and a motor 110. In both of these diagrams a motor 110 forces two drive wheels 114 to rotate and thereby causes the inner run 103 of the torus skin to move relative to the outer run 102. More specifically, portions of the inner run are pinched between the drive wheels 114 and the motion assisting component 106 which is often comprised of a friction imparting ring located within the torus. In these exemplary embodiments, the motion assisting component 1206 is a solid structure. Both FIGS. 11A and 11B illustrate a single motor driving a plurality of drive wheels; however, two different drive biases are illustrated. In FIG. 11A the motor 110 drives the device through an axial belt 1201. An axial belt engages the axis region of each drive wheel and causes rotation. In FIG. 11B, the motor 110 drives the device through an outer surface belt 1202 engaging the outer surface of both of the drive wheels 114. Additionally, a portion of the outer surface belt is pinched between the drive wheels 114, the inner run 103 of the skin 101, and the motion assisting component 1206 and the belt friction engages the skin and forces the inner run 103 of the skin to move relative to the outer run 102 of the skin 101.

Figure 12:
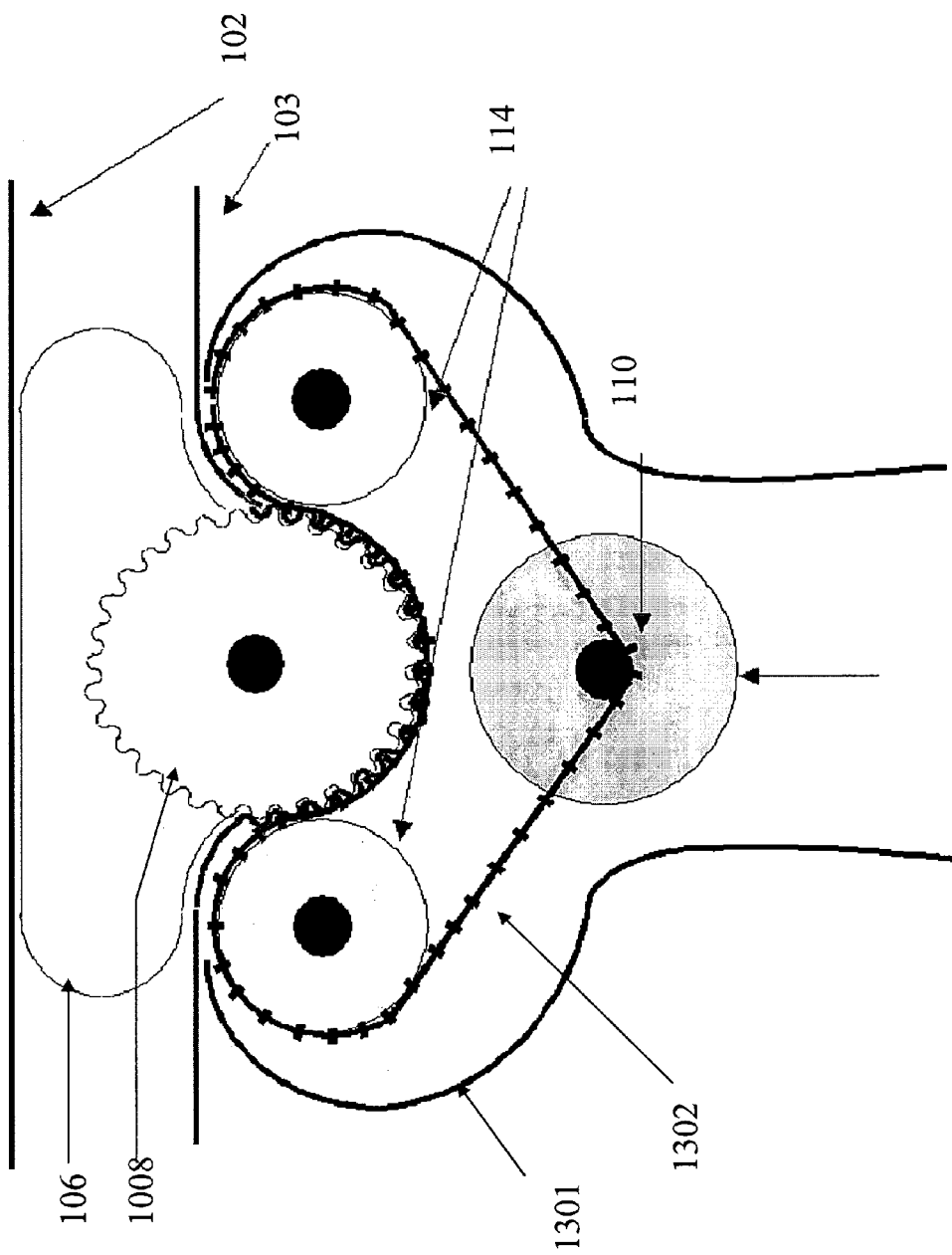
Figure 13:
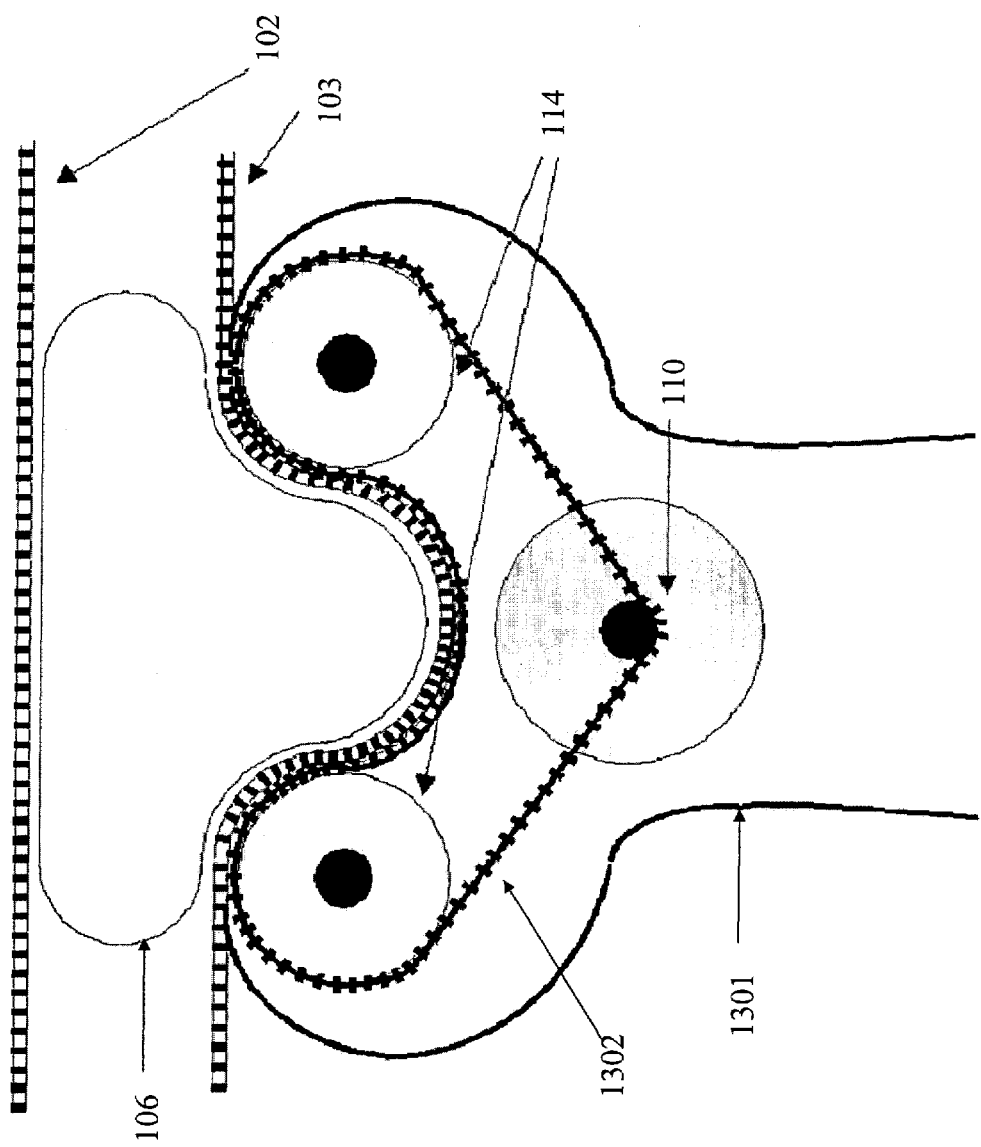

FIGS. 12 and 13 are further embodiments of the drive geometry depicted in FIG. 11B. In both FIGS. 12 and 13, a compliant drive system housing 1301 that functions similarly to a spacer member 112 is illustratively depicted. The compliant drive system allows movement longitudinally between the inner run 103 and the interior body 105 or motor 110. The compliant drive system housing 1301 absorbs bumps or surface changes and allows continual frictional engagement of the skin by the skin engaging unit 111.

In FIG. 12, a double-sided toothed drive belt 1302 connects the motor 110 to the drive wheels 114. The double-sided toothed drive belt 1302 meshes with teeth molded into an idler wheel 1008 pinching the skin 101 between. When the motor 110 rotates the belt 1302 and the drive wheel 114, the skin 101 is moved and propulsion occurs. Additionally, the torus may be toothed as well to allow it to directly mesh with the toothed belt as is illustrated in FIG. 13.

Figure 14:
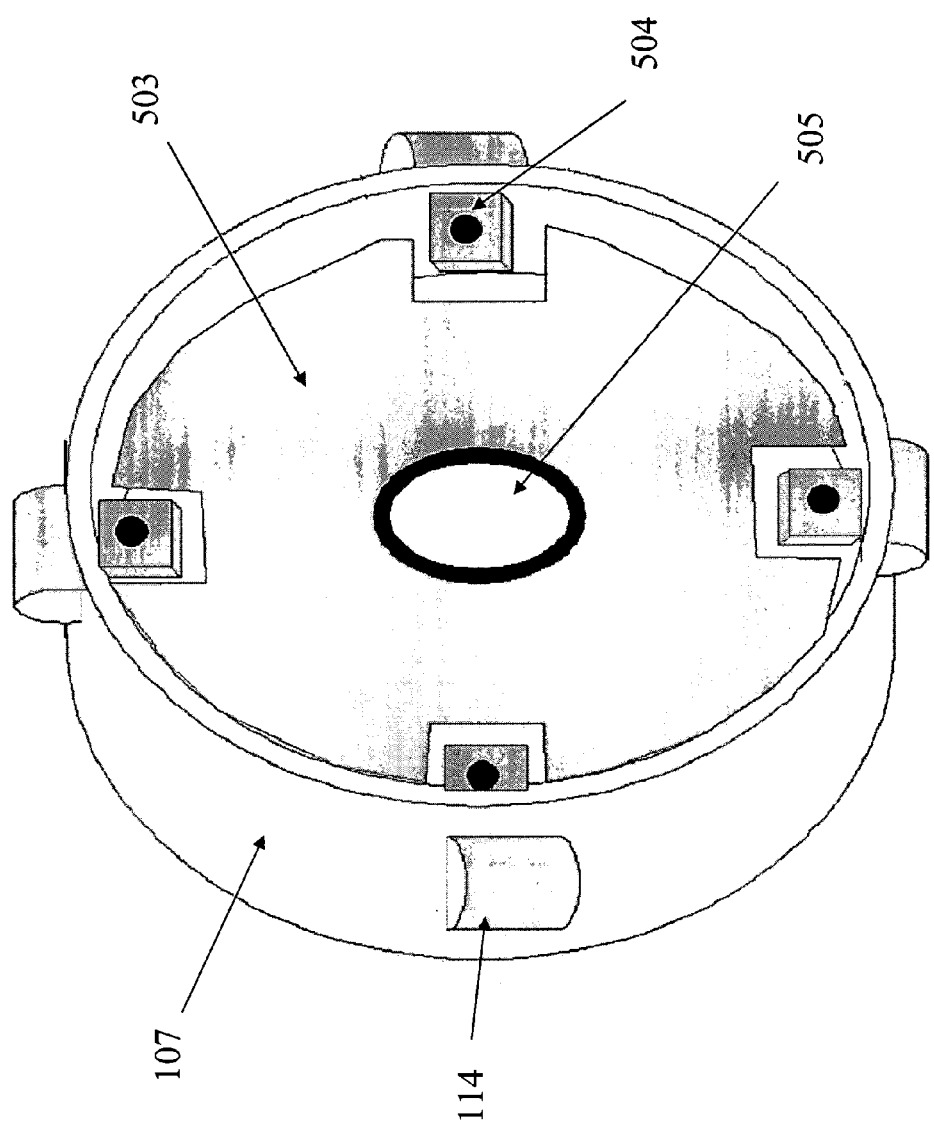
FIG. 14 illustrates an exemplary diagram of a friction imparting ring.

FIG. 14 is a diagram of an exemplary embodiment of a drive segment 109. This drive segment is comprised of a friction imparting ring 107, drive wheels 114 with interior electric motors and gear reducers, a servo and drive electronics circuit board 503 that is attached to the friction imparting ring, and solenoids or linear actuators 504. The solenoids or linear actuators provide angular actuation and are connected to the next vertebra. Additionally, a power and control cable 505 is located within the radial interior of the circuit board, and more generally, the radial interior of the friction imparting ring.

A separate motor located within each drive wheel allows precise control of each drive wheel. Additionally, each drive wheel can be moved at different angular or tangential speeds or directions. Precise control enables precise steering and pivotal motion. Certain segments of the body can be moving in a first manner or direction while other segments of the body are pivoting or moving in a completely different direction or manner. These motion capabilities enable the device to achieve complex rectilinear and non-rectilinear motion equivalent to and sometimes superior to biological snake movement. Further, by placing the motors within the drive wheels, the interior of the body can be filled with more electronics, circuitry, and cables for transferring power or transmitting signals including controls, video recordings, or sensor readings.

FIGS. 15-18 depict exemplary embodiments of snake-type robots. One snake-type robot has a head 1801 and a tail 1802, but the snake-type robot need not have either. Generally, the snake robot is considered to have a body 1800, a head 1801, and/or tail 1802. The head and tail members are attached to the body. Further, a cable or cord 1803 may be attached to the tail 1802 of the snake-type robot through which power may be supplied to the robot and signals, data, and controls may be transferred to and from the snake through the cable or cord. The head 1801 may also include further function enhancing features that may be extended or protruded including any common mechanically operated claw for grasping, carrying, or holding objects, any common suction device for extracting small particles, or any lighting structure. The function enhancing features may allow retrieval of objects, particles or fluids for further investigation and/or movement of the objects, particles, or fluids to a different location than the extraction locale.

The body 1800 is typically composed of a plurality of drive segments coupled together. The exterior of the body 1800, as described earlier is defined by the outer run 102 of a torus skin. Motors, electronics, portable power sources, and various other components are housed within the interior of the body. The interior of the snake robot can be defined for illustrative purposes as the area radially inward of the inner run 103 of the torus skin 101.

Figure 15:
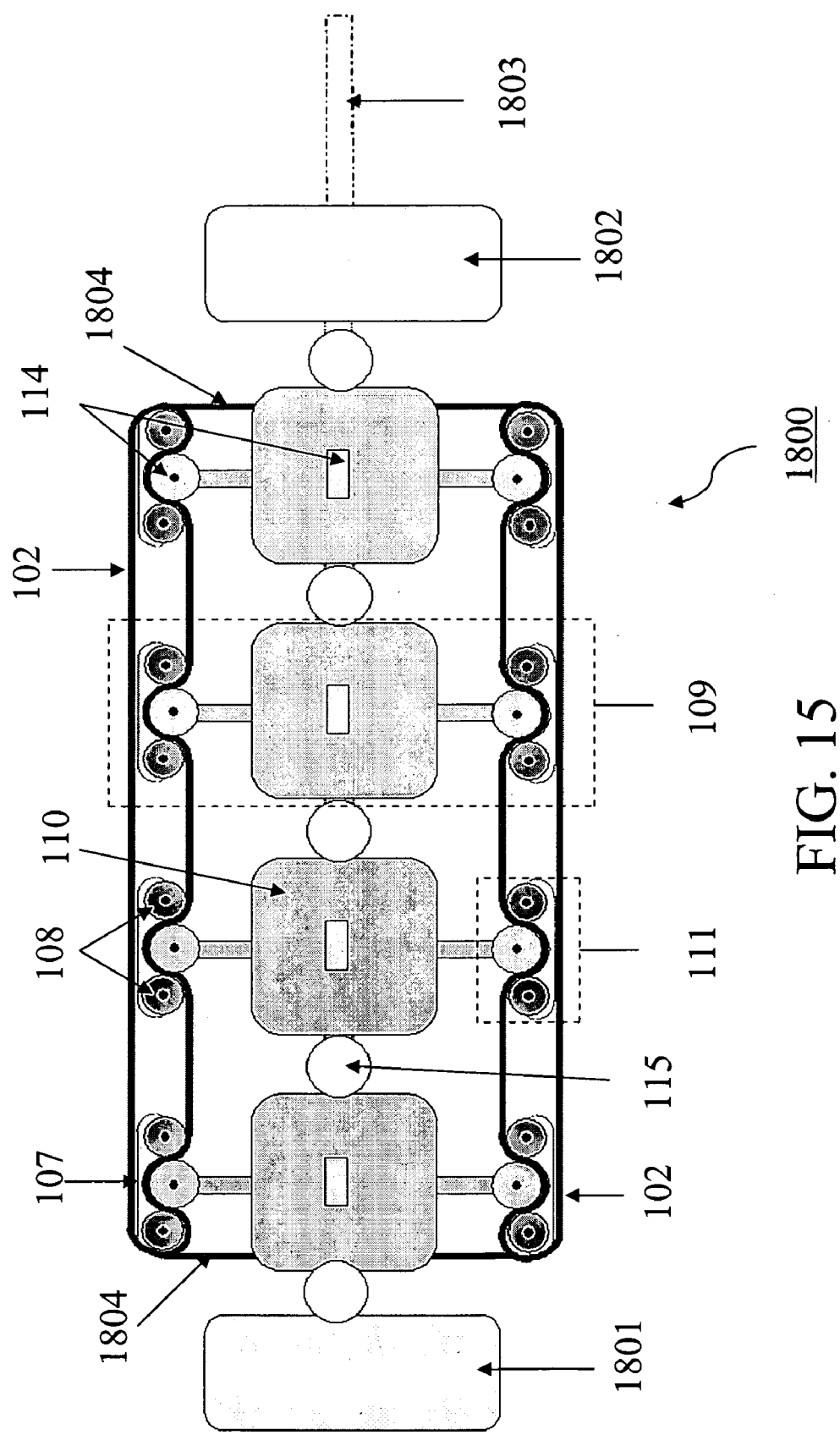
FIGS. 15-18 illustrate exemplary diagrams of a snake-type robot.

To prevent foreign matter from entering the interior body, ends of the torus body may be covered 1804 as depicted in FIG. 15. To allow a better seal from foreign matter without impeding motion, brushes may be used that contact or are proximate to the moving skin. Additionally, the configuration of the system limits the amount of foreign matter likely to enter the interior of the body. The moving skin enters the rear (or tail portion) of the body and exits the front (or head portion) of the body. Since the skin exits rather than enters the front of the body with respect to its general path of motion, it is unlikely to chum or irritate the surroundings and toss particles into the interior of the body.

Figure 16:
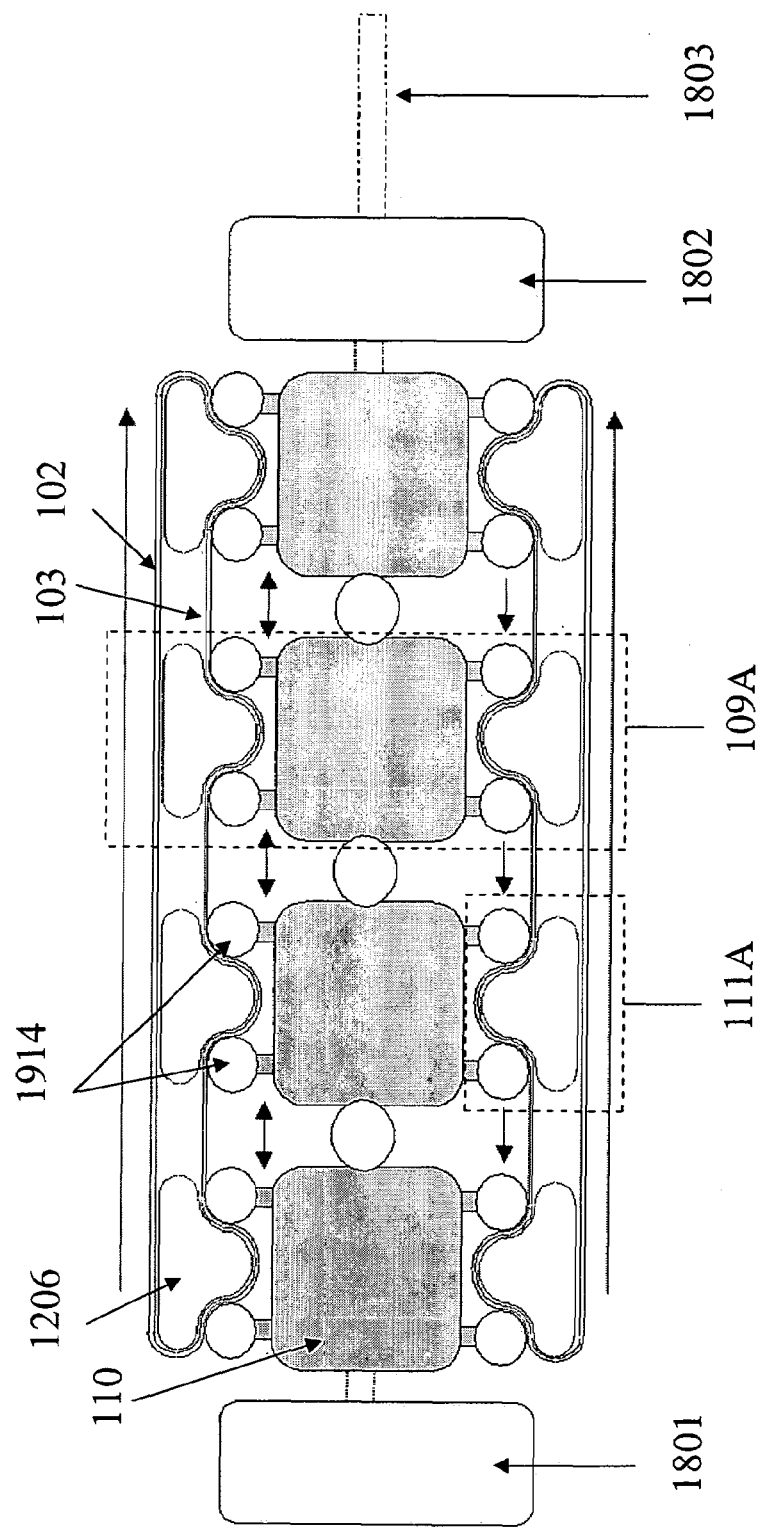

FIG. 16 is a further illustrative diagram of an exemplary embodiment of a single skin snake robot with a head 1801, and a tail 1802. The drive segments 109A of this snake robot are composed of a skin engaging unit 111A and a motor 110. The skin engaging unit 111A includes two drive wheels 1914, and a motion assisting component 1206 that includes a friction imparting ring. The inner run of the torus skin is pinched between the drive wheels and the motion assisting component within the torus. The drive wheels frictionally engage the torus and cause the inner run to move relative to the outer run.

Figure 17:
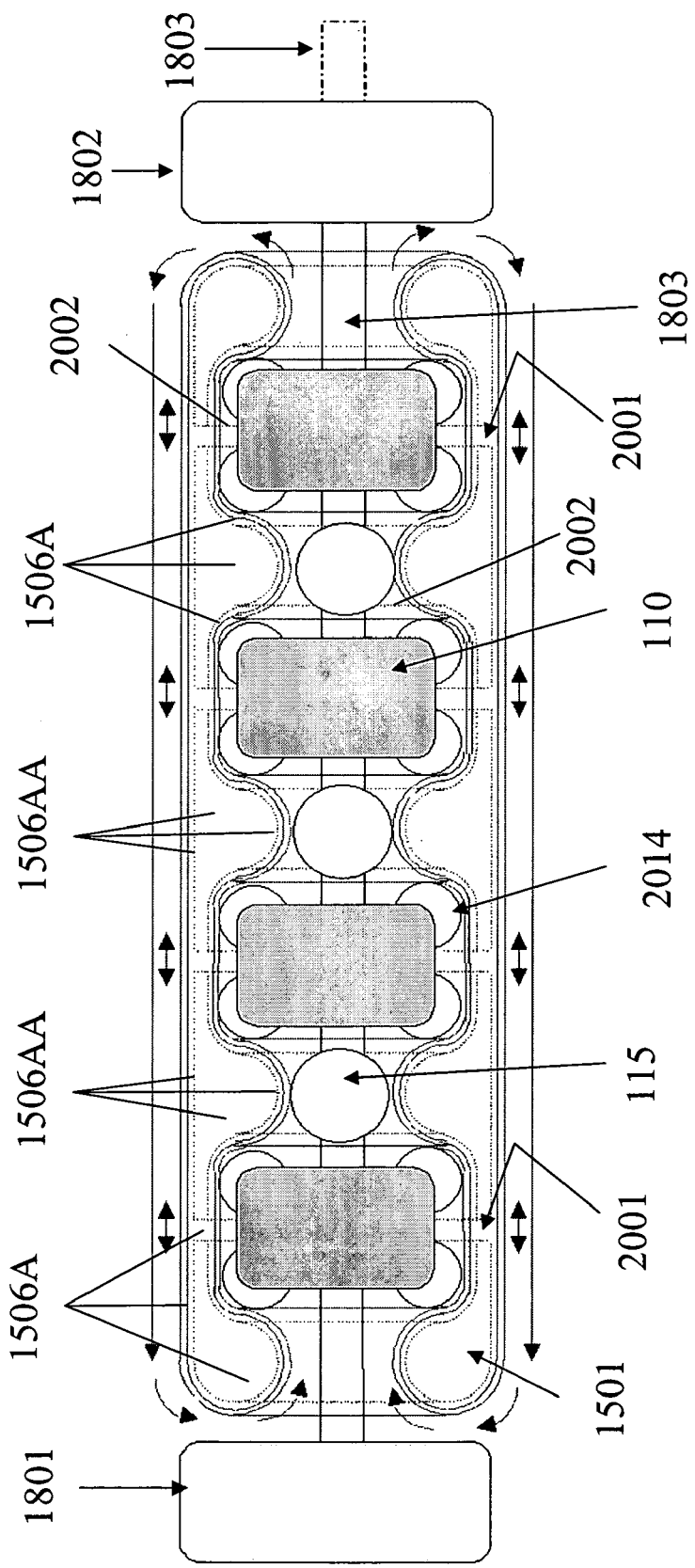

FIG. 17 is another further illustrative exemplary embodiment of a single skin snake robot with a head 1801, and a tail 1802. In this embodiment, the motion assisting component 1506A (the outer edge of which is illustrated by a solid line) placed within the torus skin is a tube with lobes 1501 located along the length of the tube. In this embodiment, portions of the inner run of the torus skin are pinched between the drive wheels 2014 the tube, and the lobes. The motor 110 rotates the drive wheels which frictionally engage the skin when pinched between the wheels and the lobes. As a result, the inner run of the skin is moved relative to the outer run. The motion assisting component or tube located within the torus could alternatively be segmented 1506AA (the outer edge of which is depicted as a dashed line). Tension springs may be located in the spacing 2001 between the tube sections to hold the segmented tube together within the torus skin. The described segmentation may allow further angular actuation. The vertical dashed alignment lines 2002 are for geometrical illustration purposes only and are not physical structures in the device.

Figure 18:
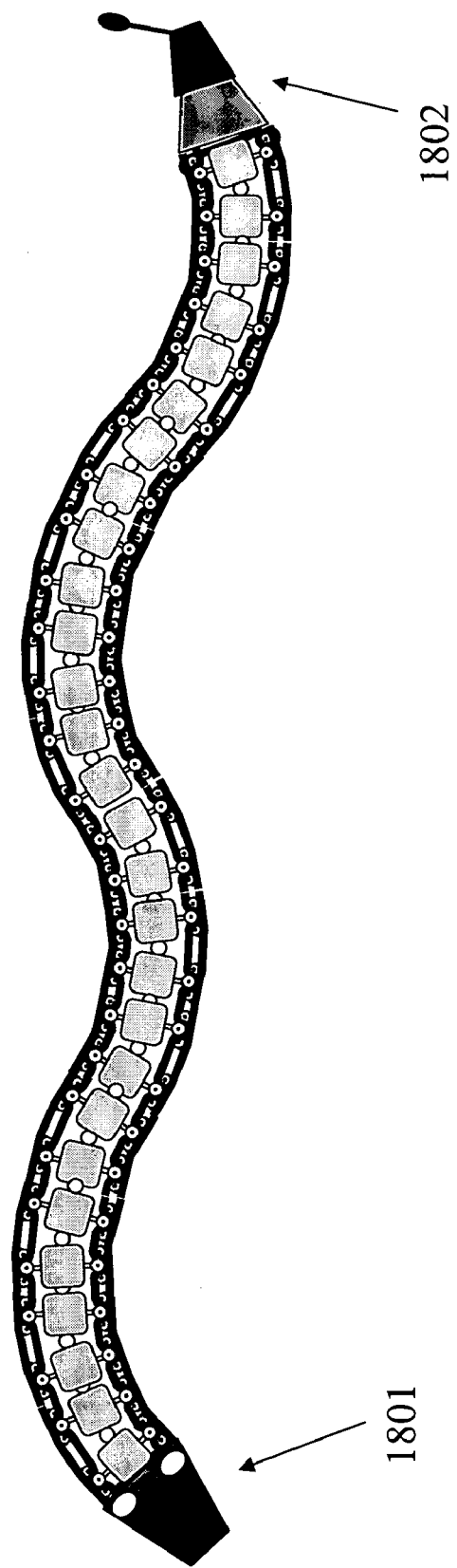

FIG. 18 is another further illustrative exemplary embodiment of a single skin snake robot and is a further illustrative embodiment of the aspects depicted in FIG. 1. The snake robot has a head 1801 and tail 1802. The tail of this robot is capable of wireless communication thereby allowing the snake robot to traverse locations where a tethered cord could become entangled.

The exemplary embodiments in FIGS. 15-18 may possess any combination of or lack thereof a head 1801 or tail 1802. The tail or head may be multi-segmented or a single element. Generally, the head and tail are highly configurable attachments to the system and are used to achieve desired functionality. The head may contain various perceptive sensors, video recording apparatus, sound recording apparatus, and numerous other technologies for obtaining evidence, observing or recording information, and allowing the controller of the robot to perceive the current and future environment information. The perceptive capabilities also aid in movement of the device.

The following is an illustrative list of sensors that may be employed. For search and rescue functionality the device preferably possesses among others one or more of the following sensing capabilities: vergence based-stereo, ultrasonic, bio-sensors including carbon dioxide or blood, sweat, or urine sensors, LLTV/uncooled FLIR, microphones, and/or through wall radar. For reconnaissance or surveillance the device may possess one or more of the following sensing capabilities: vergence-based stereo, ultrasonics, microphone, boroscope, LLTV/uncooled FLIR and/or through wall radar. These lists are only illustrative and various combinations of sensory capabilities can achieve a large number of desired functionalities.

The head 1801 may be designed in a generally conical or generally triangular shape. This design may minimize any scooping of foreign matter during movement. A grasping mechanism could also very easily be placed on the head to allow gathering of samples and collecting evidence for later use or analysis.

The tail 1802 is shaped in a generally conically or triangular shape to prevent or reduce the quantity of foreign matter to enter the torus hole and possibly impede propulsion or various other operating systems. The tail may be tethered, tethered with deployable tethered guides, or numerous other designs. The tail may be used in wireless communication to allow for communication in precarious, secluded, difficult to navigate or other similar environments. The tail segments of the snake may be deployable for various communications, power, weight or drag reduction, demolition, reconnaissance or mobility purposes. The tail portion may function in unison with the rest of the snake or as an autonomous body upon deployment.

FIGS. 19A and 19B illustrate schematic diagrams of snake-type robot configurations with a head 1801 connected to a single torus skin multiple segmented body 2401 and a multi-segment deployable tail 2402. FIG. 19A illustrates an exemplary schematic diagram of deployment of tethered guides that can be used for among other things negotiation of difficult, narrow or precarious locations, as well as for communication purposes. The tether 1803, as depicted in FIG. 19A, may be used for power and/or control communication. FIG. 19B illustrates an exemplary schematic diagram of a deployed segment of the snake for use in wireless communications. Wireless communications points 2403 allow the snake robot to continue operation in areas where traditional wireless communication may fail. The communication point can be carried with the snake until it encounters difficult terrain and the tight locale in which it will be operating. The cable is then deployed in close proximity to where the snake will be operating, and thus communication, transmission and control can be facilitated. In the exemplary embodiment depicted in FIG. 19B, the snake-type robot uses a portable power source to allow movement when the tether 1803 is not connected to the body.

FIGS. 20A and 20B illustrate further aspects of a snake tail where a single power source 2303 is used to power the motors 110 of the robot snake. In this illustration the power source is located in an end portion of the device in the tethered tail. A single power source facilitates the integration of new power technologies. Among the power sources that may be used are lithium-ion batteries and capacitors. Any conventional battery may be used. These sources are light, energy efficient, and may be moldable. The power source can be molded into shapes and orientation that conform with the design of the snake robot and its particular skin propulsion system. Tight integration can be achieved and power can be distributed along the snake body.

For communications, a cable tether 1803 may provide power, video, and control communications between the device and an operator control unit. The tether may be spooled 2302 in the tail section to eliminate the need to drag the tether, limiting snags and drag. If a snake transitions to untethered operation it can disconnect and deploy an antenna to communicate with the tethered end as illustrated in the lateral exemplary diagram in FIGS. 19A and 19B. A snake robot may possess multiple modes of operation including both tethered and untethered operation. Such capabilities may be enabled through use of an electronic interlock or similar connection means that may be used to connect the tail to the rest of the body as illustrated in FIG. 20A and 20B. Since the tethered end may become a wireless transmission point, communications underground, in tunnels, in rubble and in dense foliage is possible. Ultra-Wide Band technology may alternatively be implemented as it is known to possess superior multi-path noise immunity.

Further, maintaining situational awareness through the utilization of on-device cameras during snake-like motions may entail the use of computers, algorithms, and mathematical path equations that allow unique movement. Any conventional remote control systems may be used to control the snake-type robot. A computer or a human with the aid of computer technology may also control the device. An operator control unit which can comprise any conventional computer technology or PDA or similar device, can be used to display a sensor-eye view from the device's cameras, a display of the device's body configuration, and a terrain map with the selected or proposed path.

Specifically, use of visual serving technology can be used to allow significant automatic movement. For example, the operator selects a target in a video image for the device to approach. The device then moves itself toward the target, corrects movement errors, and updates its tracking template as the device approaches the target.

Figure 21:
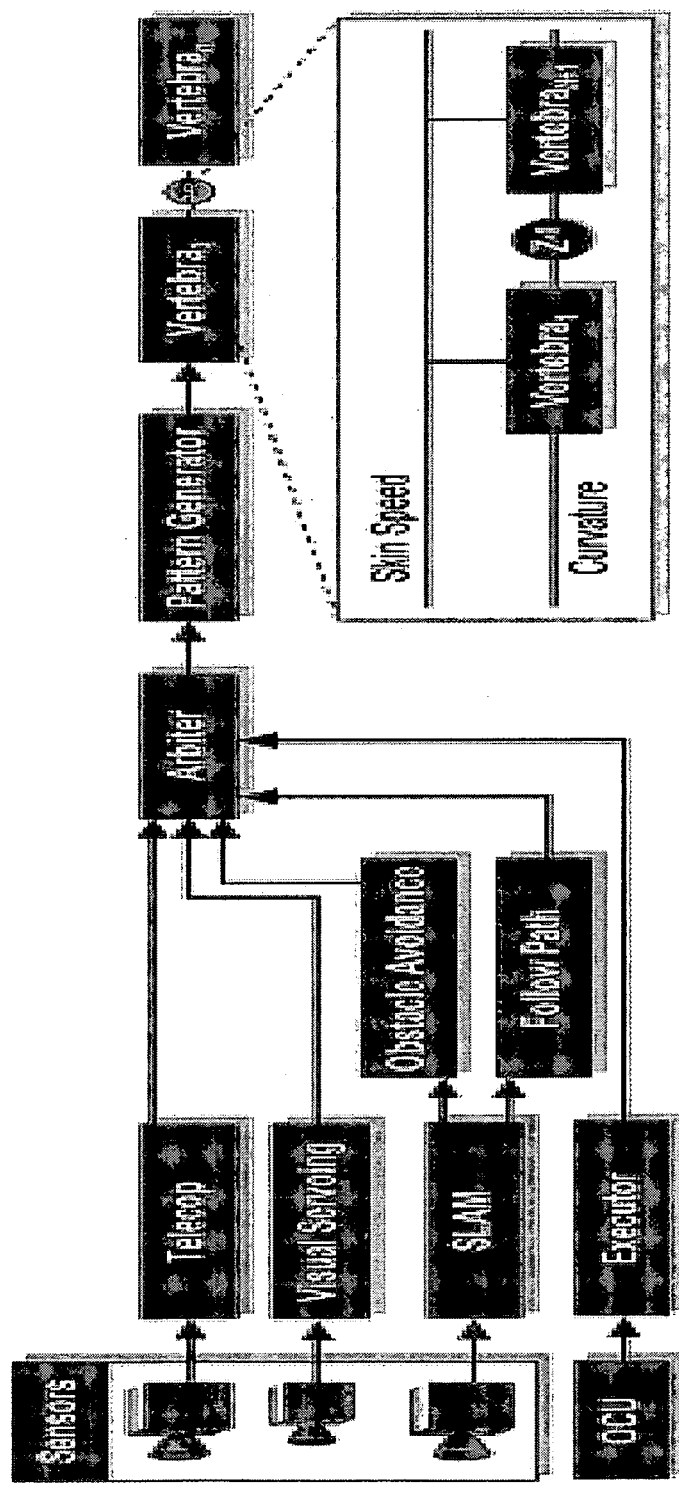
FIG. 21 illustrates exemplary pattern generation software architecture for controlling a snake-type robot.

FIG. 21 is an illustrative flowchart showing how feedback from the sensors within the snake-type robots head 1801 and operator controls are combined using a pattern generator to move each select drive segment 109 (i.e. vertebra) at the appropriate time and in the appropriate manner. The device's interaction with an operator may range from continuous control inputs during teleoperation to periods of complete autonomy during visual serving. In this manner, the snake-type robots can perform snake-like movements.

The operator control unit may include a joystick or touch screen that may be used to "drive the head" of the snake-type robot while the on-board pattern generator produces control inputs for the spine of the device. Additional controls may be utilized for manual mobility mode selection and grabber control. Control system hardware may be composed of two parts: a centralized "brain" responsible for high-level planning, sensor processing, and goal-seeking; and a "nervous system" which directly controls actuators, gathers feedback from sensors that may be located on the body, and performs reactive or reflex behaviors. The main processor may consist of a small, powerful single-board computer.

The "spinal cord" may consist of a series of low-cost micro-controllers, one located in each drive segment or vertebra of the snake. All actuators within a single vertebra are under direct control of the local micro-controller. The controllers are interconnected with each other and the main processor via a "spinal-cord"—a bi-directional serial interface bus (CAN-bus or $I^2C$ bus depending on controller and main processor selection).

The "brain" performs all high-level planning sensor processing and intelligent control. The pattern generator combines the resulting modal commands with the heading and speed commands from the arbiter to generate snake-like body motions. The pattern generator's control signals are passed through the serial bus to the first micro-controller node, which performs appropriate actions and propagates the command to the next micro-controller node after a time delay based on the speed of the body motion. In this manner, control signals are propagated to all nodes along the "spinal cord." Similarly, sensory input and motion feedback data from each body segment are passed to the "brain" for additional processing. Decentralization of low-level control functions enables a degree of purely reactive control similar to involuntary motion in humans, and animals. For example, the detection of an impinging object may trigger local body movement to leverage against the object for increased efficiency on unstable terrain.

Snakes, like many fish, create a traveling wave of increasing amplitude down the body. Detailed studies of the flow field around a swimming fish indicate turbulence reduction in the flow boundary layer near the body in trough phasing. This "flow relaminarization" phenomenon helps to reduce the drag on the body. Depending on the ratio of the traveling wave velocity and the forward speed of the snake, the fluid may be "pumped" in the downstream direction by the traveling wave to create thrust.

A Finite-Analytic Navier-Stokes (FANS) code, an unsteady Reynolds-Averaged Navier-Stokes (RANS) solver, may be used to simulate the physics of the anguilliform swimming motion. A moving-body computational model of the robot's anguilliform swimming motion and high-resolution grid can be used. The model represents among other things the device's shape, weight distribution, kinematics, actuator speeds and limits, and buoyancy information. Time-accurate RANS simulations can be performed to provide the needed forces, powers, and flow details. Simulations can be done in calm water to show the thrust generation mechanism and swimming speed. Further, in certain embodiments, the toroidal skin can act as a completely sealed bladder. This functionality can be exploited to adjust buoyancy balance. Slight positive buoyancy is achieved so that the robot can swim on or beneath the surface.

Some biological snakes use anguilliform motion to burrow into sand, vegetative matter, and loose soil. The high traction provided by full-body skin propulsion, combined with anguilliform motion drives the snake body into snow, sand, vegetative matter, and loose soil. Robot snakes also have unique climbing abilities. In some cases, robot snakes will outperform biological snakes. Some snakes such as rat snakes climb tree trunks using straight rectilinear motion. Other snakes use a combination of rectilinear and lateral undulation. Robot snakes may be able to perform these maneuvers and have the additional advantage of a full-length skin propulsion system.

If the body is being propelled forward while the angular actuation is occurring, steering and propulsion occur simultaneously allowing various complex types and paths of movement. By combining angular actuation with propulsion, biological snake-like movements can be replicated. Sidewinding, which incorporates throwing head and upper body and then transferring the weight to the forward area and repeating the process, may also be achieved. Serpentine motion or sinusoidal body movement can be performed. Additionally, concertina, or caterpillar-like motion and bunching & lengthening of the body may be achieved. The torus skin and drive system further allows comparatively high speed rectilinear motion while the steering systems described in FIGS. 5, 6, 7, 8A and 8B allow precise steering in coordination with this rectilinear motion that outperforms biological snakes. Bodies containing an active skin propulsion and steering system are able to climb, swim, burrow and even jump.

In the end view diagram of the active skin propulsion system illustrated in FIG. 2, there is an orthogonal arrangement of the spacer members 112 that allows the drive wheels of the skin engaging units 111 to move the skin 101. An orthogonal arrangement of the spacer members 112 and skin engaging units 111 allows the active skin propulsion system to operate in any side up mobility. Movement of the device is not impeded should the device be inverted from its original orientation. The entire outer run surface contact element of the device serves as a propulsion means. Any side up mobility allows this device to travel in extremely rough terrain. It further allows the device to traverse steep inclines in which devices would be immobilized if inverted. It also allows the device to travel in tight corners, pipes, tunnels, air ducts, and similar hard to reach locales in which locomotion though movement on a horizontal surface may be impossible. Even if frictional traction is only available in random orientations throughout a passageway the active skin system can traverse it.

Figure 22:
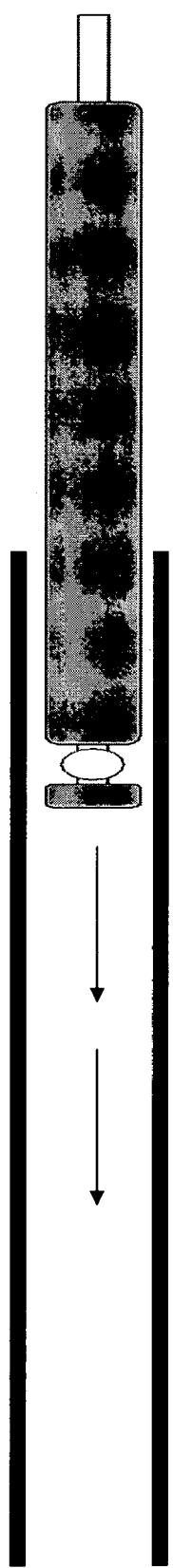
FIGS. 22, 23, 24A, 24B, and 24C illustrate exemplary diagrams of a snake-type robot's movement capabilities.
Figure 23:
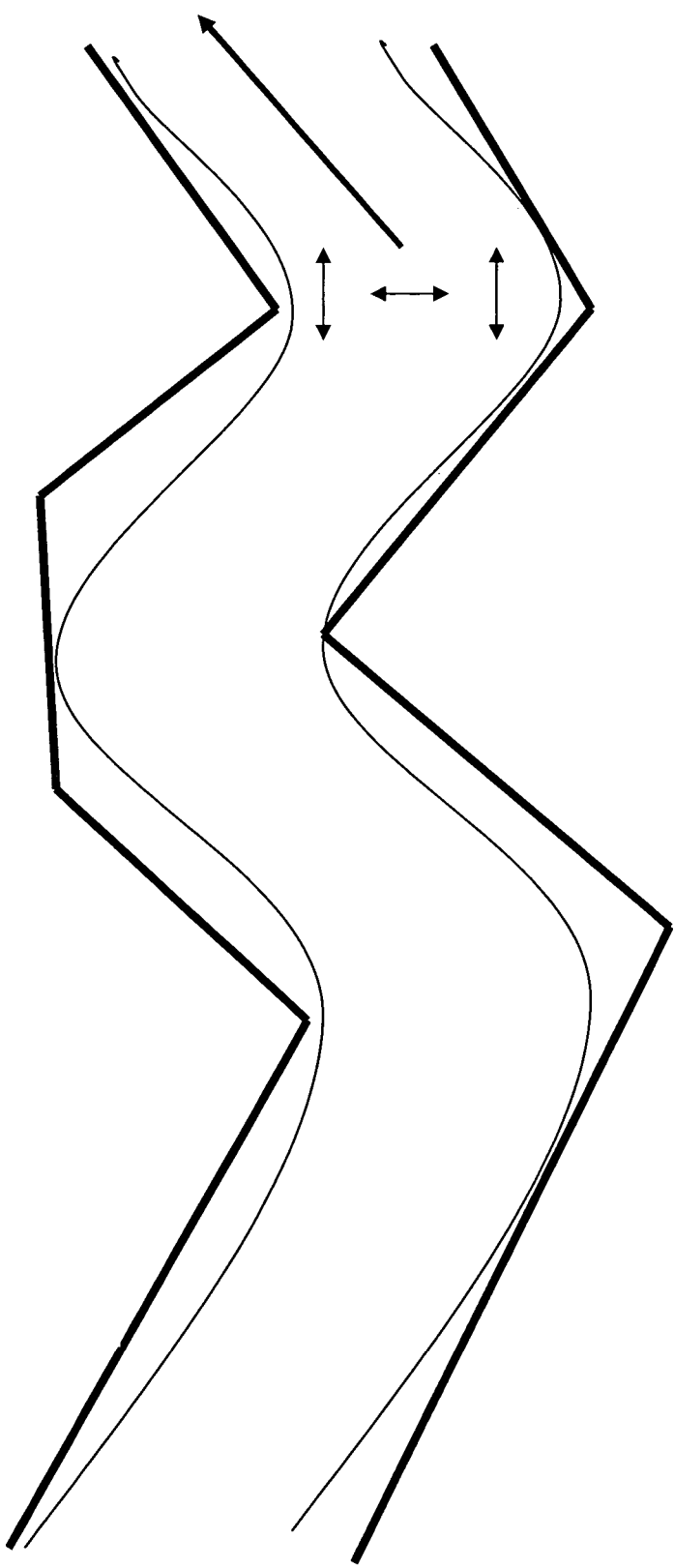
Figure 24C:
Figure 24B:
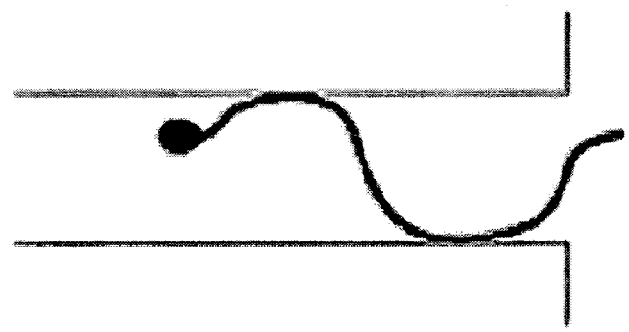
Figure 24A:

Various exemplary movement capabilities of the device are illustrated in FIGS. 22, 23 24A, 24B, and 24C. Specifically, FIG. 22 is an illustrative depiction of a snake robot's ability to perform rectilinear motion. Rectilinear motion allows the snake to crawl pipes, negotiate uneven terrain, and move quickly. In FIG. 23, the snake robot's steering capabilities combined with its rectilinear propulsion allow it to maneuver in irregular and jagged bends in small areas. Further, FIG. 24A depicts the robot snake's ability to climb poles and similar structures. Using its vertical and lateral actuators, the snake wraps its body around the pole and grips it. Once in position, the skeleton and actuation means holds the pose as the skin propulsion system powers the skin, causing the snake to spiral round and up the pole. FIG. 24B illustrates an exemplary method for a robot snake to climb an air duct and other interior surfaces larger than the body's diameter. The lateral actuators exert pressure against the sides of the duct. With the skeleton holding pose, the skin drive powers the skin, causing the snake to ascend the duct. FIG. 24C illustrates an exemplary method for a robot snake to enter a small opening in a barricade. Using the vertical actuators to lift the head to the appropriate height, the snake moves toward the opening using rectilinear motion. When the skin contacts the edge of the opening, traction is gained, and the snake can proceed through the opening by passing the vertical "step" down the body.

One method of moving the snake is to "drive the head" and let a pattern generator create the body motions needed to move the head along a path. In more autonomous functioning snake robots and devices, autonomous path planning in complex terrain may become an integral of part of motion. Robot snakes' motion planning is based on Generalized Voronoi Graphs (GVG). Generally, in three dimensions the GVG finds that path that is equidistant from the three nearest objects, i.e., $d_i(x)=d_j(x)=d_k(x)$. GVGs can be generated as the platform moves using location and distance data, thus enabling the platform to explore the area and plan body motion and pose.

In addition to using encoded drive motors, strain or pressure gauges can also be used to enable the vertebrae controllers to sense the local skin conditions. By manipulating local skin drive motors and signaling neighboring vertebra, local areas of high strain or slackness can be moderated. During motion over complex terrain that may induce drag, variable friction, twisting strains on the skin, local feedback loops may be used to reduce differential stress, thus improving efficiency and skin life.

A torus skin that defines the body of a snake-type robot can be fit to any convex shape and allows robot snakes to exist in numerous shapes. Based on terramechanics, robot-type snakes may have a roughly triangular or a flattened elliptical cross-section similar to the shapes of certain biological snakes. The aforementioned cross-sectional designs may increase the contact area on hard flat surfaces; however, the active skin can be fit to any convex shape to achieve desired functionality.

The torus skin which defines the body provides many functions in addition to its use for propulsion. Among the characteristics that affect skin performance and functionality include texture, flexibility, and chemical resistance. The material composition of the skin is varied according to desired functionality. The skin should possess a certain amount of flexibility yet still be strong enough to withstand continuous cycling around the body of robotic drive components.

Elastomers are a likely choice for the torus skin of a snake-type robot. Monolithic materials, woven and composite materials and flexible Kevlar-impregnated composites are among the numerous types of materials that can be used to compose the active skin. Butyl rubber sheeting, chloroprene (neoprene), and translucent rubber sheeting are materials that can be used to compose the torus skin 101. Based on desired functionality, various skin materials may be chosen.

Additionally differential elasticity may be desired to shrink radially into the center hole while maintaining a fixed skin length. Some axial elasticity may be needed to handle steering baseline changes. Each polymer chosen may have tradeoffs for elongation, hardness, abrasion and resistance. Additionally, chemical resistance to conventional lubricants may be a desirable property when choosing skin 101 composition to allow lubricants to be used to reduce the friction inside the skin. Additionally, a preferred skin embodiment may be waterproof or water resistant but the skin does not have be resistant to water.

Figure 25:
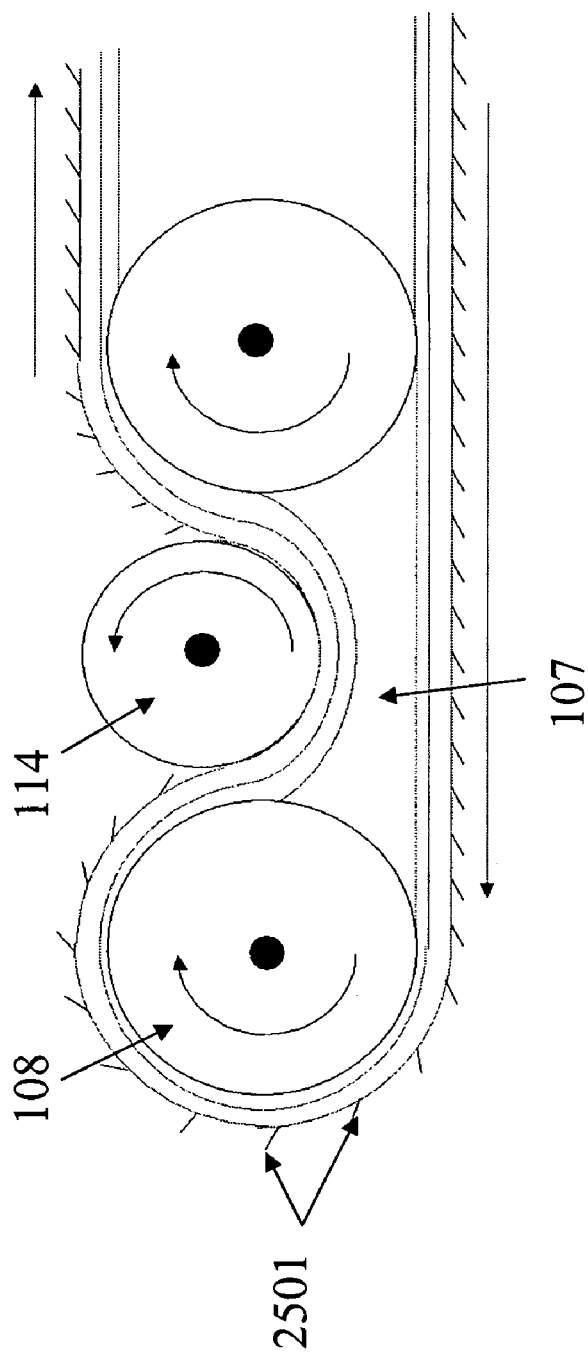
FIG. 25 illustrates an exemplary diagram of friction enhancing elements attached to the torus skin.

To enhance contact friction or grip, the skin may be textured, have molded scales or may be treated or coated with chemicals or particles. Any design enhancements to the skin to increase ground friction to improve traction, swimming, climbing or any other capability of the device may increase certain functionalities. FIG. 25 is an illustrative diagram of further aspects of skin engaging units in use with an active skin with friction enhancing elements 2501. The friction enhancing elements protrude from the skin and can be affixed as part of the skin, as an attached layer covering part or all of the skin, or preferably as elements molded to or bonded within the skin material. Other changes may be made to the outer surface of the skin to allow better grip and contact between the skin and the environment that it contacts while imparting motion on the body. Friction enhancing elements that fold or compress when contacting the drive wheel or wheels allowing easier passage when pinched as the skin moves during propulsion may also be used. In the embodiment in FIG. 25, the inner run of the torus skin with friction enhancing elements 2501 is pinched between a friction imparting ring 107 and attached idler wheels 108 located within the torus skin and a drive wheel 114 pinch the skin with scales.

Depending on specific attributes, drive systems configuration and components used, assembly of the device may be performed in numerous ways. In one exemplary manner of assembly split rings such as the ring depicted in FIG. 3 are installed in the active skin propulsion device by first placing the split drive rings inside the skin between inner and outer runs of the skin. The skin is then sealed. The torus, with friction imparting rings, is then pulled over the internal body and the internal body portions of the drive segments. More specifically, the split friction imparting rings are spread to move over the drive wheels on the drive segment. When the correct ring associated with the drive segment is in position, the ring is spread and moved over the drive wheels to trap them in the center dip. In essence the ring is snapped into place. After the friction imparting rings are in place and the body is generally aligned a head and/or a tail may be attached to the body. As a result of the aforementioned assembly and configuration, the springs within the split friction imparting ring provide enough tension to capture the drive wheels and successfully allow the drive wheels to frictionally engage the skin. Various methods of assembly in addition to the method described here can be used to construct or assemble the device depending on the specific components used, the specific structures included, the size of the device as a whole or certain portions of the device, and the materials used in the device.

Figure 26:
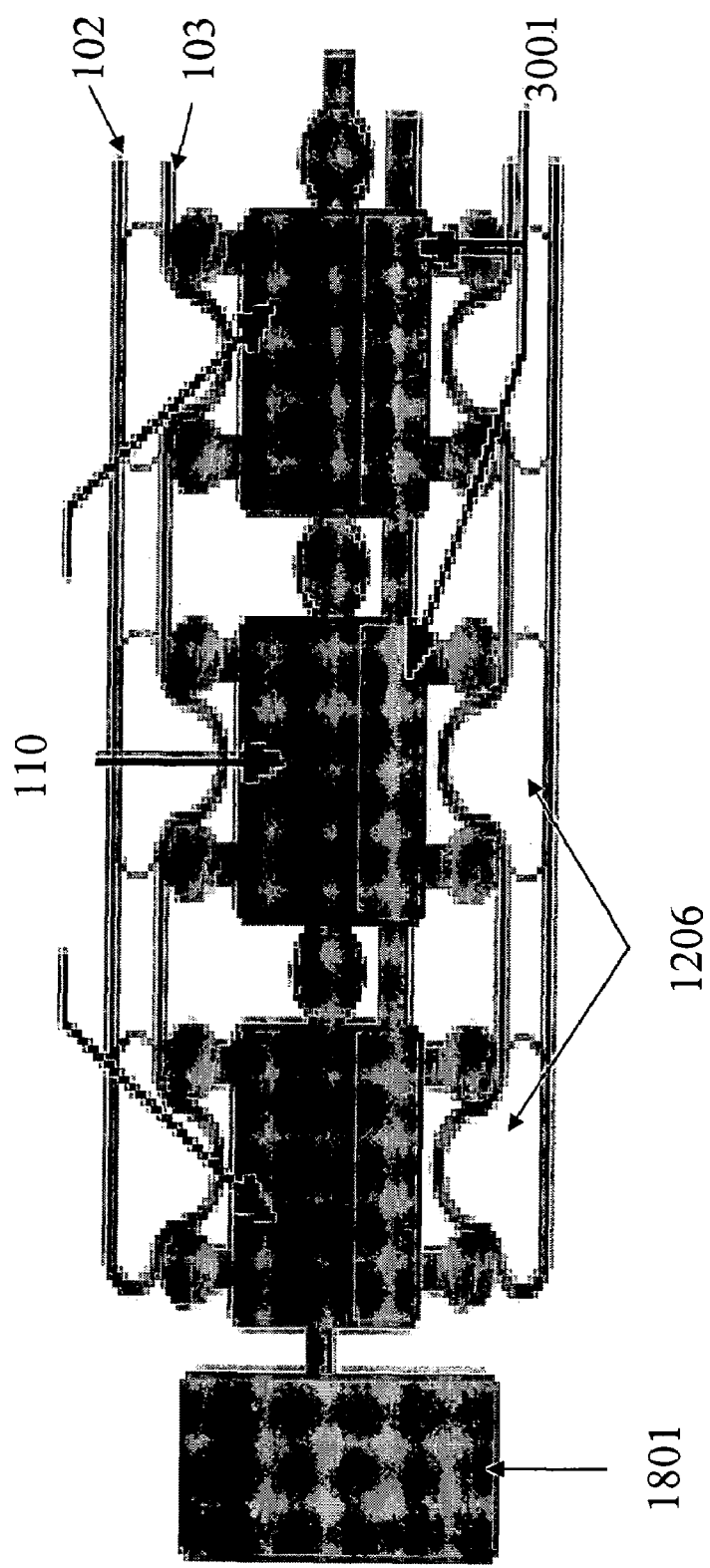
FIG. 26 illustrates a distributed power system of an active skin propulsion system.

As described earlier, the snake-type robot can be powered through a tether attached to a power source and/or a portable power source. An exemplary diagram of one embodiment of a snake-type robot containing portable power sources 3001 is depicted in FIG. 26. The power sources (batteries) depicted are located in close proximity to the motors 110 within each vertebra or drive segment. Commonly used batteries may be utilized and specifically chosen based on desired functionality including weight, duration, and power characterisitcs. By locating the portable power sources throughout the device, the weight associated with each of the sources can also be distributed throughout the device. The power sources may also be formed to fit a specific shape including the overall shape of the robot.

Figure 30:
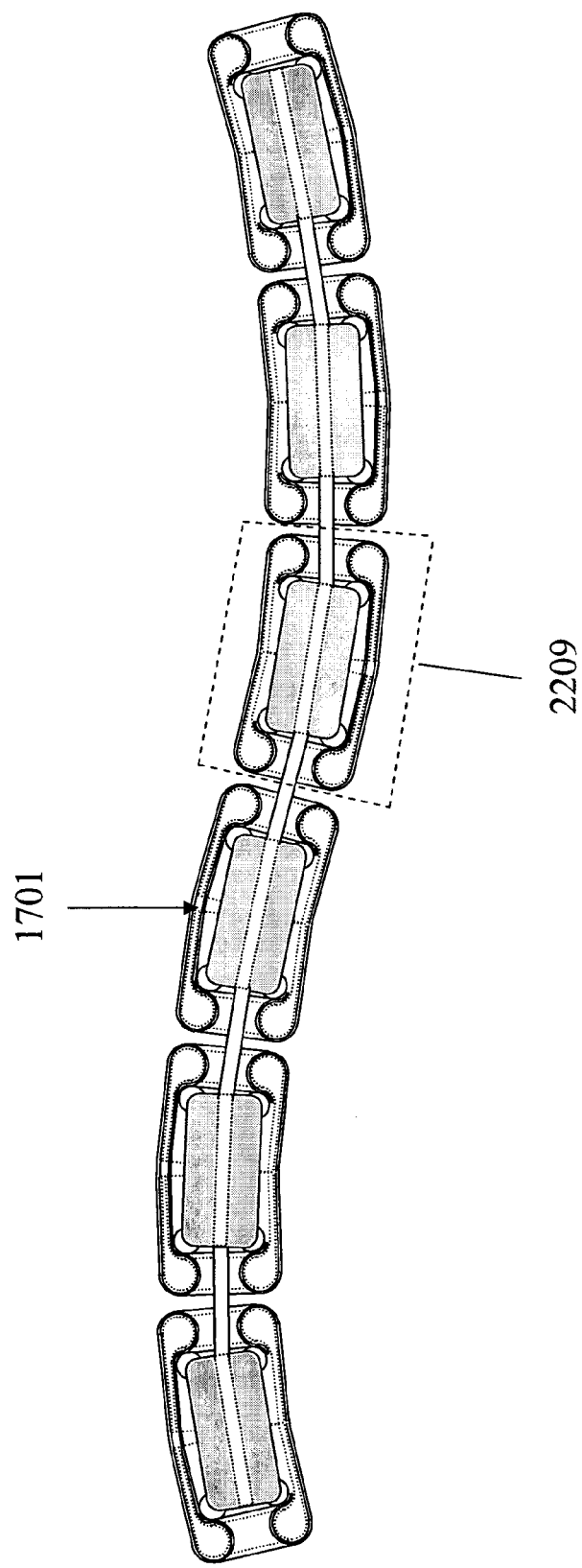
FIG. 30 illustrates an exemplary diagram of multi-skin multi-segment snake-type robot.

Active skin snake-type robots can be single skinned devices (as shown in FIGS. 15-18) or multiple skinned devices (as shown in FIG. 30). The coupling 115 used to connect drive segments of the snake robot together vary depending on the desired functionality, required drive and steering geometry and characteristics, and required rigidity of the connection. These couplings were described earlier in the description.

Figure 27B:
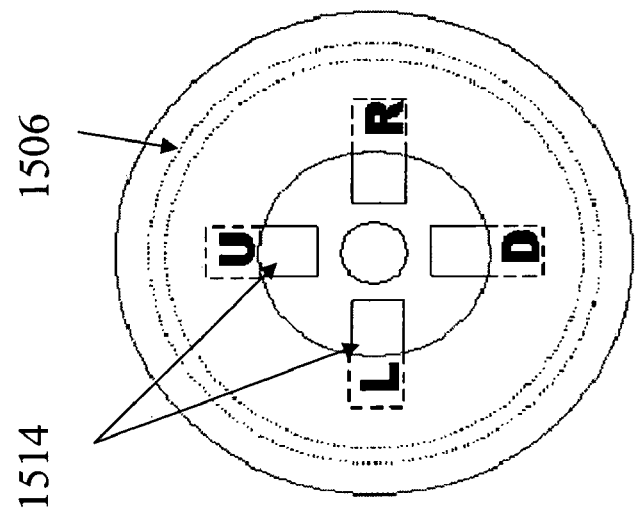
FIGS. 27A, 27B, 28, and 29 illustrate exemplary diagrams of drive segments.
Figure 27A:
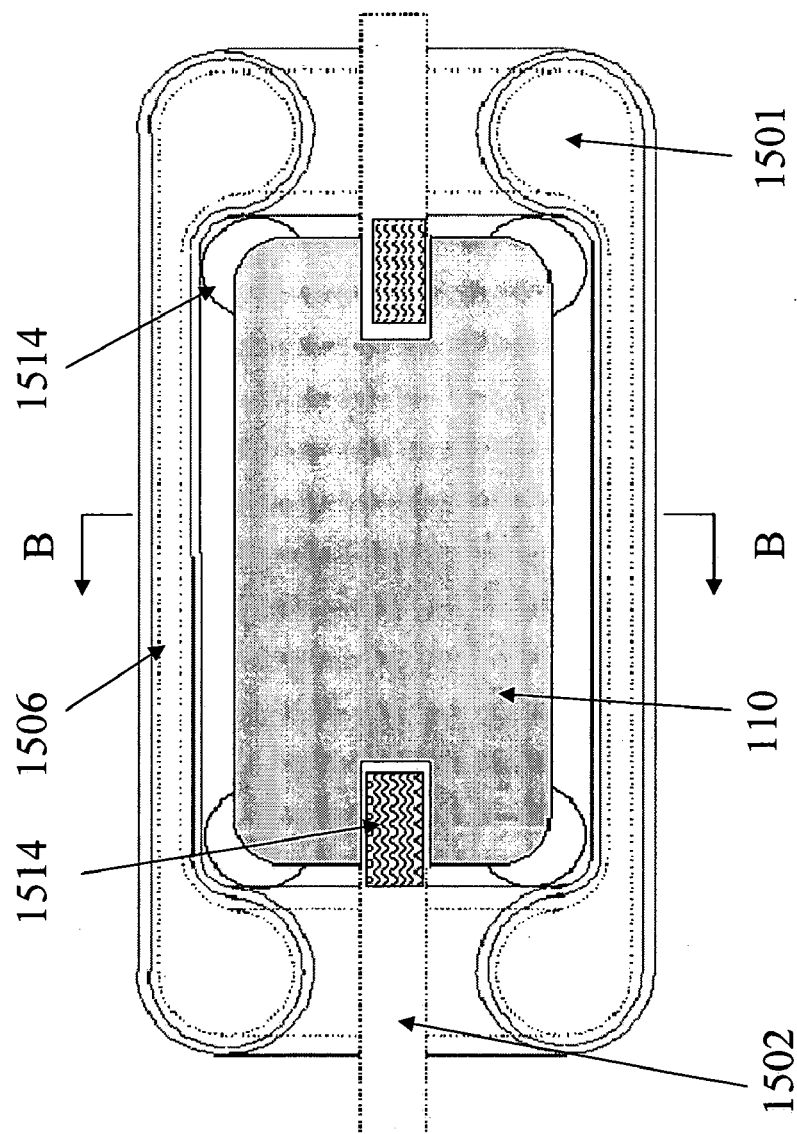
Figure 28:
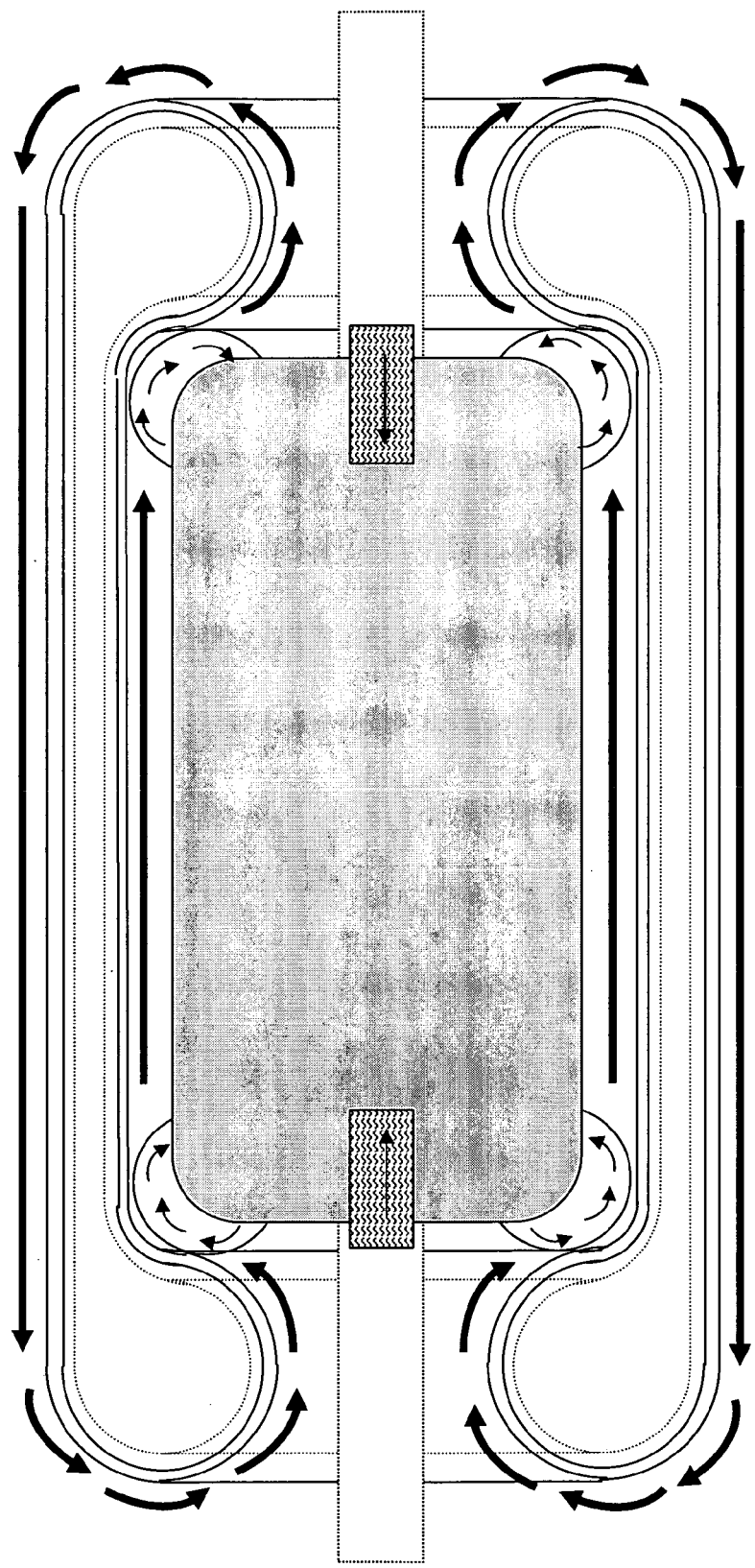

FIGS. 27A, 27B, 28, and 29 are illustrative diagrams of further embodiments of drive segments of an active skinned propulsion system. In FIG. 27A the drive segment includes a motor 110, drive wheels 1514 and a tube 1506 located within the torus skin as a motion assisting component. The tube in this embodiment contains lobed ends 1501 further allowing the drive wheels to frictionally engage the skin. The drive wheels 1514 in this embodiment are located diagonally from the center of the drive segment around the circumference of the body as is depicted in the end view shown in FIG. 27B. In FIG. 28, arrows further illustrate the direction of movement of the skin and drive wheels of the drive segment embodiment shown in FIGS. 27A and 27B in order to propel the body.

Figure 29:
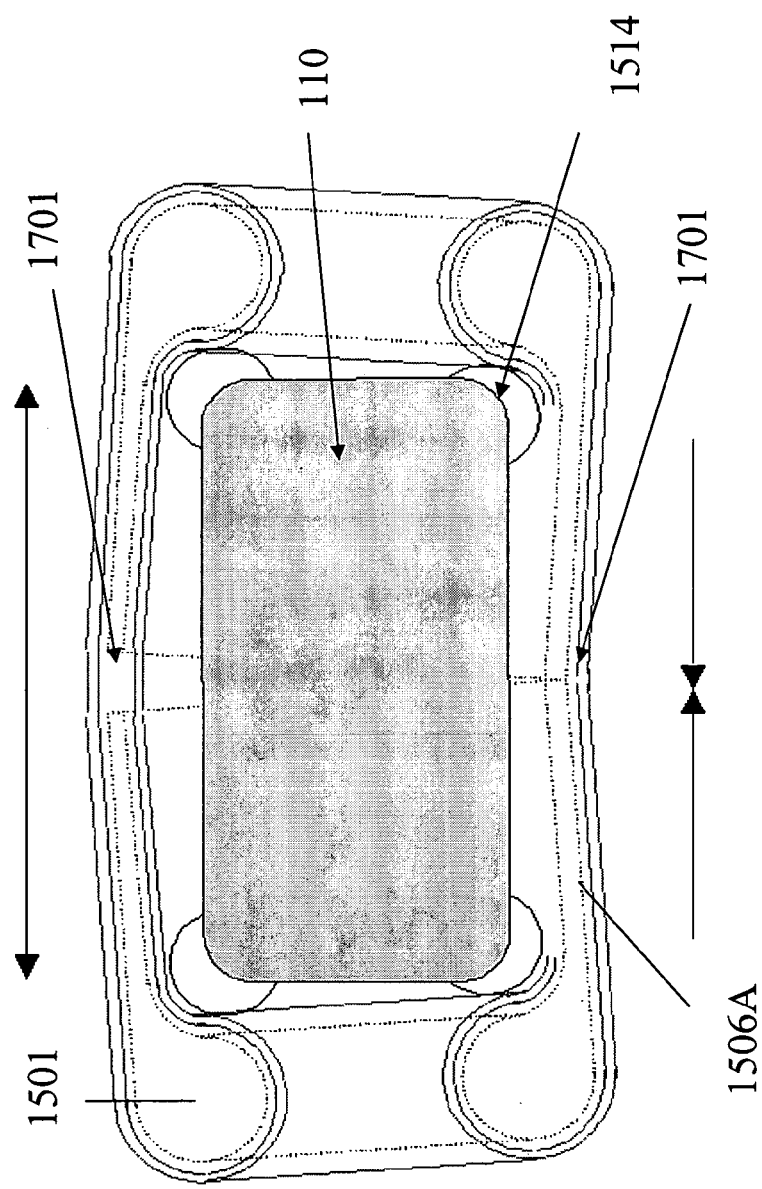

To increase angular actuation and steering capabilities, the drive segment embodiments depicted in FIGS. 27A, 27B, and 28 can alternatively be made with spring loaded half-segments. In the embodiment illustrated in FIG. 29, the drive segment contains motion assisting tubes 1506A split in half at their longitudinal mid-point 1701. Between the half segments, springs are placed that hold the tube together. When sufficient actuation force occurs, the spring allows actuation. The geometry of the half segment, especially their shorter length and spring connection, allow greater angular actuation and more responsive or sharper turning capabilities. In FIG. 30, several drive segments similar to those described in FIG. 29 are linked together to form a snake-type robot composed of multiple skins. Each drive segment includes its own torus skin body. The exemplary snake-type robot depicted in FIG. 30 is multi-skinned and multi-segmented.

FIGS. 31A, 31B, 32A, 32B, 33A, 33B, 34, 35, and 36 illustrate two further embodiments of a snake-type robot at different completion points in the assembly process. These particular snake-type robot embodiments can be constructed so as to be very small in physical size. Specifically, just to further illustrate the approximate size of the miniature embodiments, these snake-type robots can measure less than one quarter of an inch or smaller in diameter, thereby allowing maneuverability in the tightest of quarters.

Figure 31B:
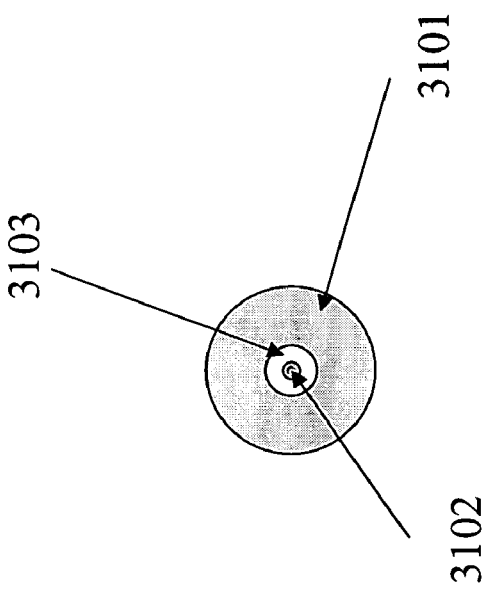
FIGS. 31A, 31B, 32A, 32B, 33A, 33B, 34, and 35 illustrates an exemplary diagram depicting the assembly of a multi-skin multi-segment snake-type robot.
Figure 31A:
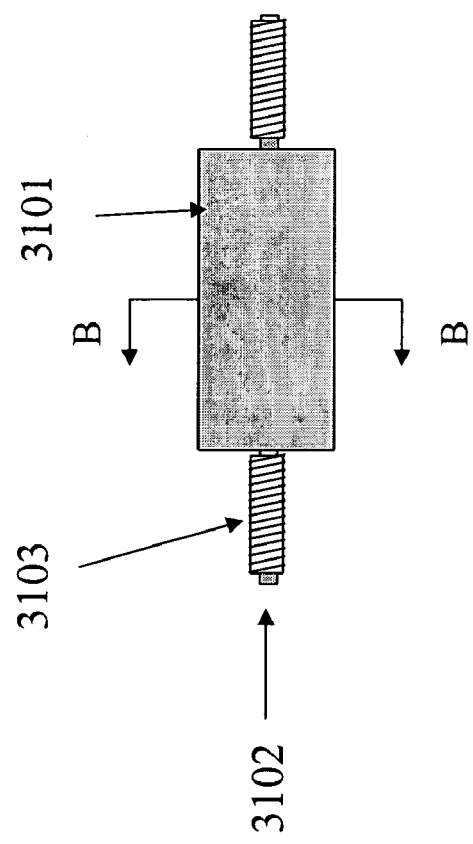

FIGS. 31A and 31B are illustrative diagrams of the motor and accompanying shafts used in a segment of an embodiment of a snake-type robot. FIG. 31A depicts a diagram of a dual shaft motor 3101 that powers dual shafts 3102. Attached to each of the dual shafts is a drive worm gear 3103. The threading of the worm gears that will assist in driving the snake-type robot may be varied depending on end goal functionality with respect to the desired speed and power output. FIG. 31B illustrates an end view diagram of the dual shaft motor 3101, the dual shafts driven by the motors 3102, and the attached drive worm gears 3103.

Figures 32A, 32B:
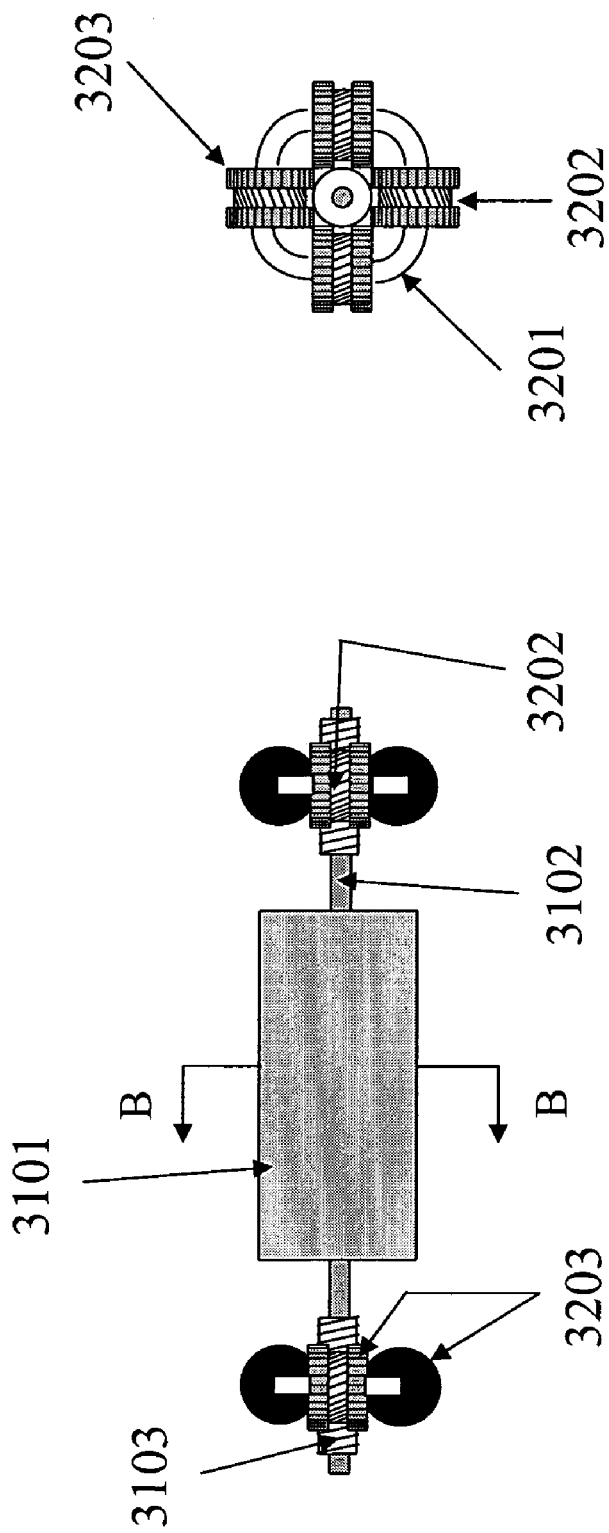

Mating worm gears 3202 are placed so as to engage the drive worm gears 3103 as depicted in FIGS. 32A and 32B. Additionally, a support structure 3201 provides rigidity and holds these gears generally in position. Further attached to the mating worm gears 3203 are friction tires 3203 that engage the torus skin of the snake-type robot and cause propulsion. Not depicted in FIGS. 32A and 32B is a further support structure that connects the quad mating worm gears 3202 and friction tires 3203 to the motor 3101 so as to prevent significant lateral movement. FIG. 32B is an end view further illustrating the arrangement depicted in FIG. 32A.

Figures 33A, 33B:
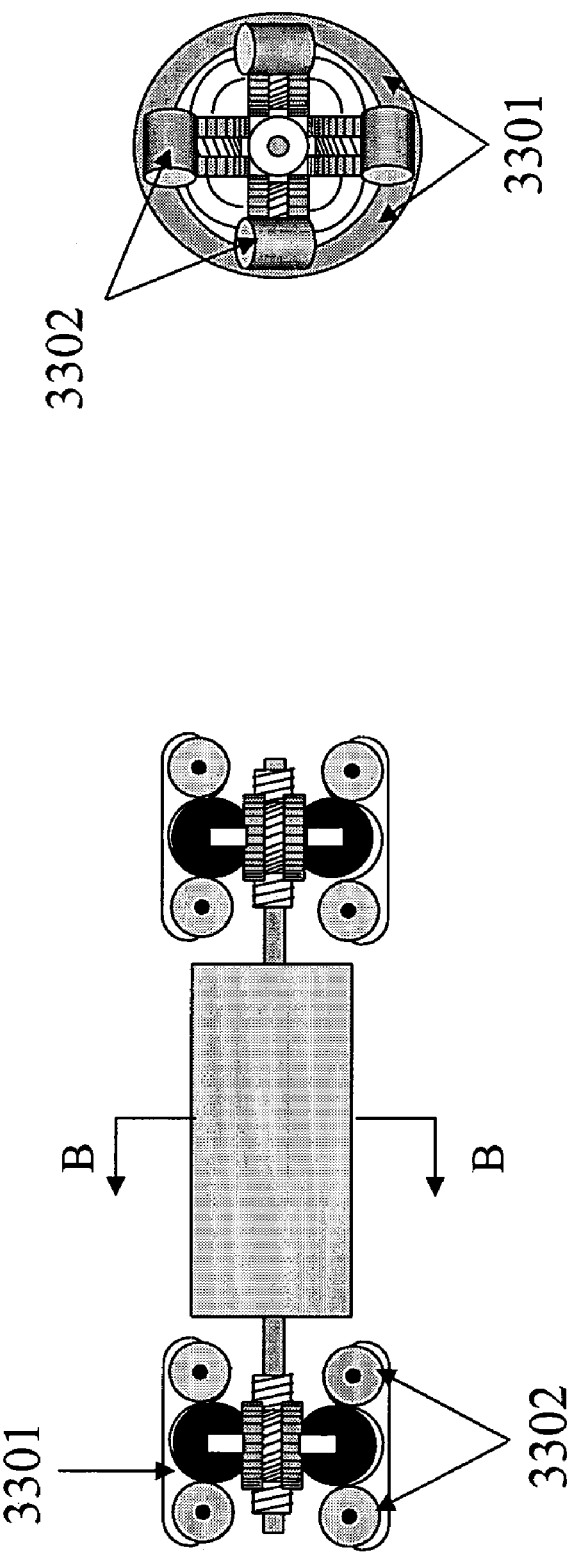

Drive rings 3301, similar to the various types described earlier, are then placed so as to circumscribe the friction tires and attached components as is illustrated by the diagrams in FIGS. 33A and 33B. In this particular embodiment, idler wheels 3302 are utilized to engage the torus skin, however, many functionally similar structures can be utilized to aid frictional engagement.

Figure 34:
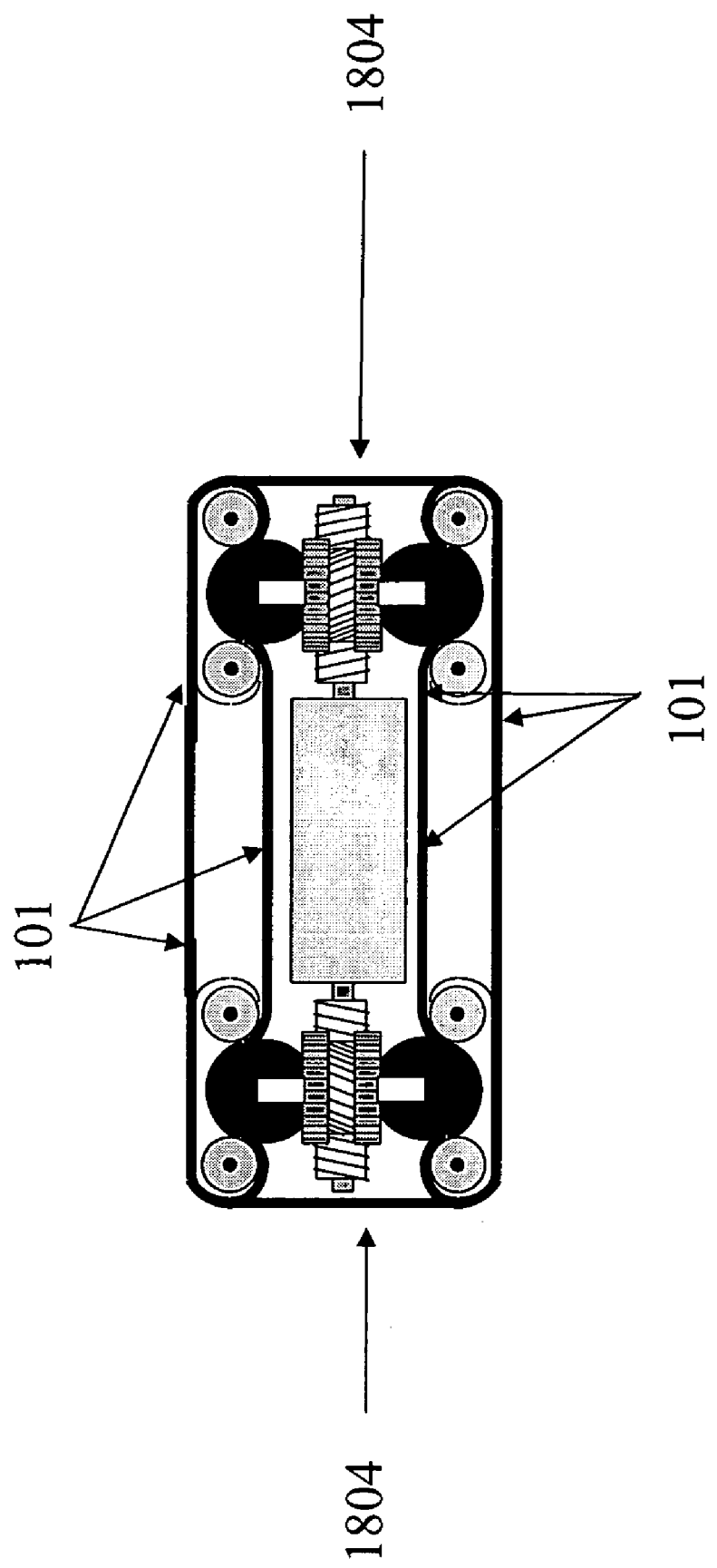

The torus skin 101 is then installed as illustrated in FIG. 34. The skin may be pulled over the drive hardware so as to enable frictional engagement of the skin by the drive hardware. The drive ring 3301 utilized may be a split ring, such as the one illustrated in FIG. 3, to further facilitate assembly of the device. Additionally, a protective covering 1804 may be placed over the front and/or rear ends of the drive segment to prevent foreign matter from disrupting motion as was previously shown and described with respect to FIG. 15.

Figure 35:
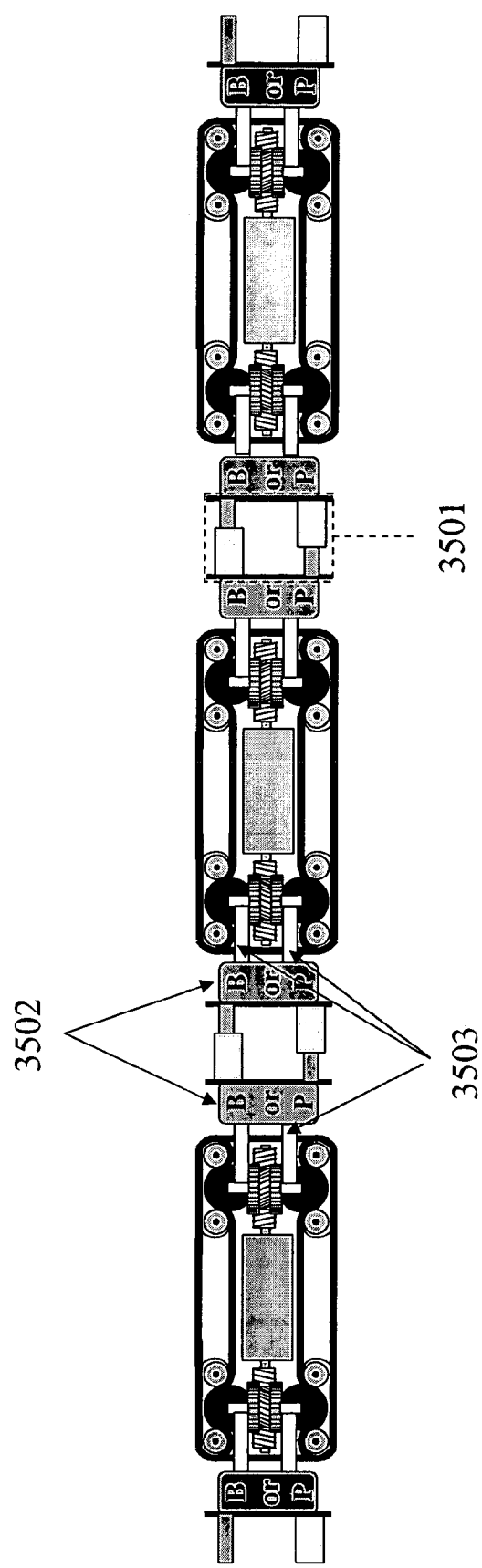

Drive segments assembled through the steps depicted in FIGS. 31A, 31B, 32A, 32B, 33A, 33B, and 34 can be linked to form multi-skin multi-segment snake-type robots of varying length and segment numbers as is illustrated in the exemplary diagram FIG. 35. In this particular embodiment, angular actuators 3501 are used to link the segments together and allow steering. Further, batteries or other payload (represented with B or P) 3502 depending on the functionality of the particular snake-type robot may be placed between the segments of the robot. Additionally, structural members 3503 are used to physically connect the actuators and batteries or payload to the segment itself. Attachment for structural members 3503 will usually occur at some point on the support members 3202, as this linking would not impede any moving components and may further provide the most structurally sound attachment point.

Figure 36:
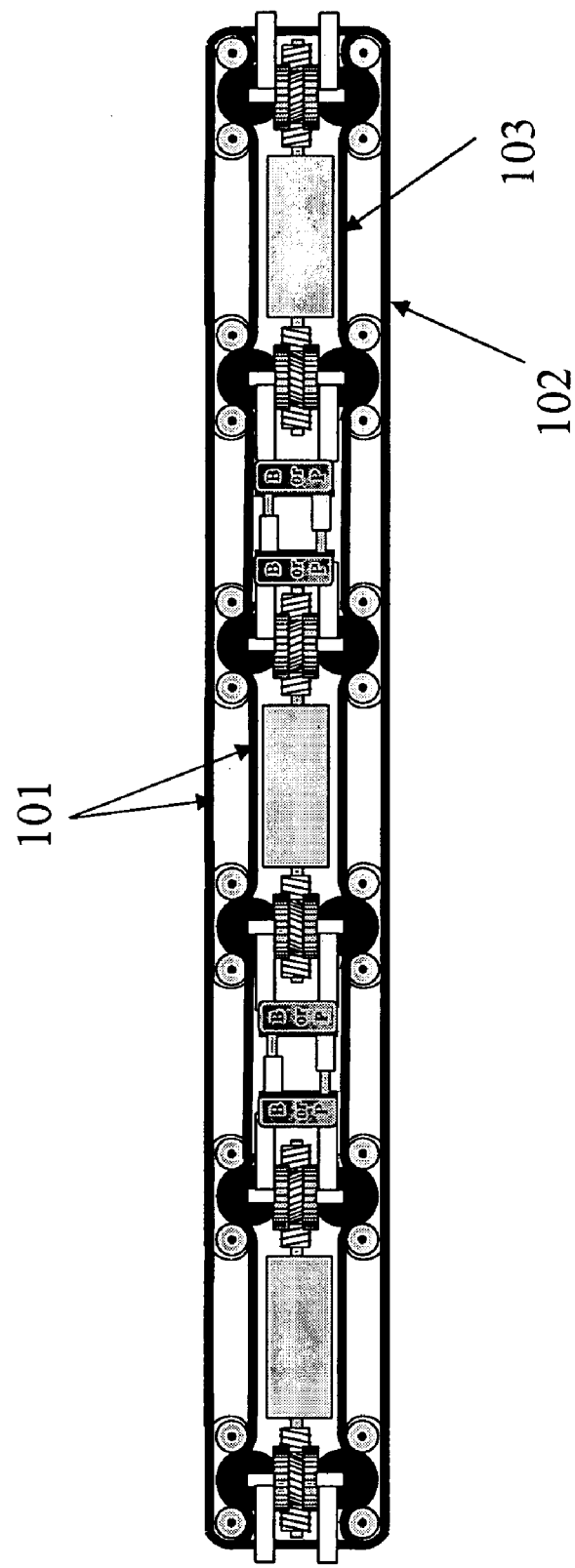
FIG. 36 illustrates an exemplary diagram of a single skin multi-segment snake-type robot.

Additionally, the assembly methods and snake-type robot components described in reference to FIGS. 31A, 31B, 32A, 32B, 33A, and 34 to construct a multi-segment multi-skin snake-type robot such as the one in FIG. 35 also can be used to construct a multi-segment single skin snake-type robot as depicted in FIG. 36.

The snake-type robots depicted in FIGS. 35 and 36 can be utilized to achieve among other things several desirable functionalities. The physical structure and geometry allow for the entire snake to achieve miniature or micro proportions. The dual shaft motor, and worm gears allows for one motor to drive each segment of the snake-type robot. Additionally, the interaction and gear/thread geometry between the drive worm gears 3103 and the mating worm gears 3202 allows the drive worms gears to be rotated rather quickly compared to the movement of the torus skin and gears and tires that engage the skin. This relationship further allows movement in miniature embodiments and allows snake-type robots to be utilized in even further confining environments.

While the invention has been described with respect to specific examples including presently preferred modes of carrying out the invention, those skilled in the art will appreciate that there are numerous variations and permutations of the above described apparatus, systems, methods and techniques. Thus, the spirit and scope of the invention should be construed broadly as set forth in the appended claims.

We claim:

1. A method of moving a device having a torus skin body with a torus skin and cylindrical shaped inner and outer runs, comprising the steps of:
    simultaneously moving the inner run and the outer run of the torus skin body in a non-rectilinear, serpentine manner, in opposing longitudinal directions; and
    propelling the device in the non-rectilinear, serpentine manner as a result of the outer run frictionally engaging a surface external to the device during the simultaneously moving step.

2. The method of claim 1, further comprising the step of tensioning the torus skin to steer the device.

3. The method of claim 1, wherein the simultaneously moving step includes rotating a plurality of drive wheels uniformly spaced about a longitudinal center line and causing the plurality of drive wheels to frictionally engage the inner run.

4. The method of claim 1, wherein the simultaneously moving step includes sliding the inner and outer runs along a plurality of friction imparting rings housed between the inner and outer runs.

5. The method of claim 1, further comprising the step of driving a plurality of worm gears each linked to a motor powered by a portable power supply.

6. The method of claim 1, further comprising the step of supplying one of power, video and control communication to the device through a tethered tail.

7. A method for moving a device having a torus skin body including a torus skin, a plurality of longitudinally linked drive segments, at least one of the drive segments having a plurality of drive wheels, the drive wheels being located on opposing sides of a longitudinal center line, comprising the steps:
    receiving a control signal from a control source;
    powering a plurality of internally housed motors each linked to a distinct drive wheel configured to frictionally engage an inner run of the torus skin body;
    rotating the plurality of drive wheels configured to frictionally engage the inner run of the torus skin body;
    biasing a plurality of skin engaging units forcing the plurality of drive wheels to frictionally engage the inner run of the torus skin body; and
    moving the inner run of the torus skin.

8. The method of claim 7, further comprising the step of moving an outer run of the torus skin body in a direction longitudinally opposite to a direction of movement of the inner run.

9. The method of claim 7, further comprising the step of rotating a first and a second drive wheel in opposing directions.

10. The method of claim 7, further comprising the step of rotating a first and second drive wheel at different speeds.

11. The method of claim 7, wherein the internally housed motors are housed within the drive wheels.

12. The method of claim 7, further comprising the step of pivoting a first drive segment relative to a second drive segment by tensioning the torus skin.

13. A method of moving a torus skin body having a pattern generator, and a plurality of micro-controller nodes, each of the micro-controller nodes being associated with a drive segment, comprising the steps of:
    receiving selection of a target;
    receiving control signals at a pattern generator for processing;
    sending output control signals from the pattern generator to a first micro-controller node;
    driving a motor housed within a device based upon the output control signals; wherein the device comprises a torus skin body
    propelling the device toward the target as a result of an outer run of the torus skin body frictionally engaging a surface external to the device.

14. The method of claim 13, further comprising the step of moving an inner run and the outer run of the torus skin body in longitudinally opposite directions by rotating a drive wheel frictionally engaged with the inner run of the torus skin body.

15. The method of claim 13, further comprising the step of receiving sensor feedback data from a sensor housed on the torus skin body and sending the sensor feedback data to the pattern generator.

16. The method of claim 15, further comprising the step of combining the sensor feedback data with control signals sent from an operation control unit.

17. The method of claim 16, further comprising the step of sending output control signals from the combining step to the plurality of micro-controller nodes, each of the plurality of micro-controller nodes receiving distinct output control signals.

18. The method of claim 15, wherein the sensor feedback data is provided by performing visual servoing.

19. The method of claim 13, further comprising the step of moving the device in anguilliform motion by controlling the plurality of micro-controller nodes with control signals resulting from a Naviers-Stokes solver.

20. The method of claim 13, further comprising the step of lifting a head attached to the torus skin body using vertical actuators.

* * * * *